United States Patent
Kikutsuji

(10) Patent No.: US 12,421,410 B2
(45) Date of Patent: Sep. 23, 2025

(54) ACTIVE ENERGY RAY CURABLE INKJET INK AND ACTIVE ENERGY RAY CURABLE INK SET

(71) Applicants: artience Co., Ltd., Tokyo (JP); TOYOCOLOR CO., LTD., Tokyo (JP)

(72) Inventor: Gosuke Kikutsuji, Tokyo (JP)

(73) Assignees: artience Co., Ltd., Tokyo (JP); TOYOCOLOR CO., LTD., Tokyo (JP)

(*) Notice: Subject to any disclaimer, the term of this patent is extended or adjusted under 35 U.S.C. 154(b) by 609 days.

(21) Appl. No.: 17/786,977

(22) PCT Filed: Nov. 18, 2020

(86) PCT No.: PCT/JP2020/043031
§ 371 (c)(1),
(2) Date: Jun. 17, 2022

(87) PCT Pub. No.: WO2021/124777
PCT Pub. Date: Jun. 24, 2021

(65) Prior Publication Data
US 2023/0102004 A1  Mar. 30, 2023

(30) Foreign Application Priority Data
Dec. 20, 2019 (JP) .................. 2019-230092

(51) Int. Cl.
| | | |
|---|---|---|
| *C09D 11/40* | (2014.01) |
| *C09D 11/037* | (2014.01) |
| *C09D 11/101* | (2014.01) |
| *C09D 11/107* | (2014.01) |
| *C09D 11/322* | (2014.01) |
| *C09D 11/38* | (2014.01) |
| *B41M 5/00* | (2006.01) |

(52) U.S. Cl.
CPC ............ *C09D 11/40* (2013.01); *C09D 11/037* (2013.01); *C09D 11/101* (2013.01); *C09D 11/107* (2013.01); *C09D 11/322* (2013.01); *C09D 11/38* (2013.01); *B41M 5/0023* (2013.01)

(58) Field of Classification Search
CPC ..... C09D 11/40; C09D 11/037; C09D 11/101; C09D 11/107; C09D 11/322; C09D 11/38; C09D 11/326; B41M 5/0023
See application file for complete search history.

(56) References Cited

U.S. PATENT DOCUMENTS

| | | | | |
|---|---|---|---|---|
| 5,919,299 | A * | 7/1999 | Kilmurray | C09B 67/0017 546/49 |
| 6,918,958 | B2 * | 7/2005 | Weber | C09B 67/0033 524/106 |
| 7,211,139 | B2 * | 5/2007 | Robertson | C09B 67/0022 546/49 |
| 7,585,364 | B2 * | 9/2009 | Deroover | C09B 67/0033 106/31.77 |
| 7,648,570 | B2 * | 1/2010 | Deroover | C09B 67/009 106/31.77 |
| 7,648,572 | B2 * | 1/2010 | Deroover | C09D 11/36 106/31.77 |
| 7,699,923 | B2 * | 4/2010 | Hoogmartens | C09D 11/36 106/31.86 |
| 8,022,117 | B2 * | 9/2011 | Deroover | C09D 11/326 347/100 |
| 8,097,663 | B2 * | 1/2012 | Bernaerts | C09D 11/326 523/160 |
| 8,197,584 | B2 * | 6/2012 | Claes | C09D 11/322 106/31.6 |
| 8,828,132 | B2 * | 9/2014 | Higashi | C09B 29/0085 106/31.77 |
| 11,845,874 | B2 * | 12/2023 | Retailleau | C08F 2/50 |
| 2008/0295734 | A1 | 12/2008 | Deroover | |
| 2008/0314285 | A1 * | 12/2008 | Deroover | C09D 11/101 106/31.77 |
| 2009/0092801 | A1 * | 4/2009 | Sato | C08G 18/0823 524/590 |
| 2010/0043670 | A1 | 2/2010 | Shiono et al. | |
| 2010/0221654 | A1 * | 9/2010 | Reichwagen | C09B 67/002 106/411 |
| 2011/0132228 | A1 | 6/2011 | Shiono et al. | |
| 2012/0026226 | A1 | 2/2012 | Kikuchi | |
| 2013/0141504 | A1 | 6/2013 | Saito et al. | |

(Continued)

FOREIGN PATENT DOCUMENTS

| | | |
|---|---|---|
| CN | 101316899 A | 12/2008 |
| CN | 101659807 A | 3/2010 |
| CN | 103131260 A | 6/2013 |
| EP | 3 118 271 A1 | 1/2017 |

(Continued)

OTHER PUBLICATIONS

Chinese Office Action dated Nov. 28, 2022 in Chinese Application No. 202080088691.9.
International Search Report for PCT/JP2020/043031 dated Jan. 26, 2021 [PCT/ISA/210].
Official Action issued on Jul. 7, 2020 in counterpart JP Application No. 2019-230092.

(Continued)

*Primary Examiner* — Sanza L. McClendon
(74) *Attorney, Agent, or Firm* — Sughrue Mion, PLLC

(57) ABSTRACT

An active energy ray curable inkjet ink comprising a pigment (A), a colorant derivative (B), a pigment dispersing resin (C) and a polymerizable compound (D), wherein the pigment (A) contains a C.I. pigment blue 15:6 and a quinacridone-based pigment at a specific amount and a specific ratio, the colorant derivative (B) contains a quinacridone-based pigment derivative, and the pigment dispersing resin (C) has an acid value and an amine value in a specific range.

6 Claims, No Drawings

(56) References Cited

U.S. PATENT DOCUMENTS

| | | | |
|---|---|---|---|
| 2019/0359836 A1 | 11/2019 | Yamaguchi et al. | |
| 2021/0332255 A1* | 10/2021 | Courtet | ............... C08F 220/301 |
| 2022/0403198 A1* | 12/2022 | Retailleau | .................. C08J 7/18 |
| 2025/0034417 A1* | 1/2025 | Kawamoto | ............ C09D 11/30 |

FOREIGN PATENT DOCUMENTS

| | | | | |
|---|---|---|---|---|
| JP | 2005-200560 A | 7/2005 | | |
| JP | 2009-197173 A | 9/2009 | | |
| JP | 2009-285904 A | 12/2009 | | |
| JP | 2010-047723 A | 3/2010 | | |
| JP | 2011-116876 A | 6/2011 | | |
| JP | 2012-030399 A | 2/2012 | | |
| JP | 2015-183147 A | 10/2015 | | |
| JP | 2017-171789 A | 9/2017 | | |
| JP | 2017-177353 A | 10/2017 | | |
| WO | WO-0204563 A1 * | 1/2002 | ......... | C09B 67/0026 |
| WO | WO-2008095801 A2 * | 8/2008 | ......... | C09B 67/0002 |
| WO | 2009010141 A2 | 1/2009 | | |
| WO | WO-2009010140 A2 * | 1/2009 | ........... | C08K 5/0091 |
| WO | 2015/033841 A1 | 3/2015 | | |
| WO | 2018/105355 A1 | 6/2018 | | |
| WO | 2018/131400 A1 | 7/2018 | | |
| WO | WO-2019081339 A1 * | 5/2019 | .......... | B41M 5/0017 |

OTHER PUBLICATIONS

Extended European Search Report dated Jan. 5, 2023 in Application No. 20904126.8.

* cited by examiner

ACTIVE ENERGY RAY CURABLE INKJET INK AND ACTIVE ENERGY RAY CURABLE INK SET

CROSS REFERENCE TO RELATED APPLICATIONS

This application is a National Stage of International Application No. PCT/JP2020/043031 filed Nov. 18, 2020, claiming priority based on Japanese Patent Application No. 2019-230092 filed Dec. 20, 2019.

TECHNICAL FIELD

An embodiment of the present invention relates to an active energy ray curable inkjet ink, and, an active energy ray curable ink set comprising the active energy ray curable inkjet ink.

BACKGROUND ART

Accompanying the decrease in printing lot size and the diversification of needs, the prevalence of digital printing methods has rapidly advanced. A plate is not required with digital printing methods, thus, it is possible to reduce costs and reduce the size of printing equipment.

The inkjet printing method which is one type of digital printing method is a method in which very fine liquid droplets of ink are jetted from an inkjet head and deposited onto a recording medium (substrate) and form images or text on the recording medium to obtain a recorded item (hereinafter, referred to as the "printed matter"). Compared with other digital printing methods, the inkjet printing method is superior from viewpoints such as the size and cost of the printing apparatus, the running costs during printing, and the ease of making full color printed matters. In recent years, the inkjet printing method has been increasingly used in industrial printing applications.

There are various inks used in the inkjet printing method such as water-based, oil-based, solvent-based, and active energy ray-curable inks. Among them, the demand for active energy ray-curable inks has been increasing due to their properties such as the speed of the drying time, and the strength of the cured film forming the print layer.

Further, in recent years, in addition to industrial printing applications, the expansion of potential applications of the active energy ray curable inkjet ink to the development to packaging applications such as paper containers, labels, and packaging films has increased. For these applications, the printing of highly designed designs and corporate colors of companies is necessary. However, when only conventional process colors are used, active energy ray curable inkjet ink is often insufficient from the viewpoint of color reproducibility. Therefore, for these applications, a special color ink is generally used together in addition to the conventional process color.

Examples of the special color ink include red ink, green ink, blue ink (also referred to as violet ink) and the like. For example, it is difficult to reproduce the color gamut required in the blue region only by the conventional combination of cyan ink and magenta ink. Therefore, specifically, a special color ink such as a blue ink may be used together (refer to Patent Documents 1 and 2).

There have been numerous reports with respect to a blue ink for reproducing the blue region. For example, there is a blue ink which uses a violet pigment (for example, C.I. pigment violet 23) having a dioxazine skeleton as a coloring material (refer to Patent Document 3). Further, there is a blue ink which uses C.I. pigment blue 15:6, 25, 60 and the like as a coloring material (refer to Patent Documents 4 and 5).

Among these coloring materials, the C.I. pigment blue 15:6 which was used in Patent Documents 2, 4, and 5 is a copper phthalocyanine pigment having an E-type crystal form. This copper phthalocyanine pigment has a reddish color compared to a copper phthalocyanine pigment having other crystal forms (for example, C.I. pigment blue 15:3, 15:4 and the like). Therefore, a copper phthalocyanine pigment having an ε-type crystal form can be suitably used as the coloring material of a blue ink.

Further, from the viewpoint of stably dispersing C.I. pigment blue 15:6 and obtaining an ink having a good color reproducibility, Patent Document 4 used a pigment derivative having a copper phthalocyanine structure together therewith. Further, Patent Document 5 used a benzoxazole pigment derivative together therewith. According to the method for using the pigment derivatives together in this way, an active energy ray curable inkjet ink having a good dispersion stability and excellent color reproducibility in the blue region can be obtained.

On the other hand, it is known that an inkjet head is used when discharging an active energy ray curable inkjet ink, and an epoxy adhesive is used in the manufacture of the inkjet head (refer to Patent Documents 6 and 7). However, the site of the epoxy adhesive used in the inkjet head may be corroded by the ink components whereby the durable life of the inkjet head may be reduced.

As a result of examination by the present inventors, all of the active energy ray curable inkjet inks disclosed in the aforementioned Patent Documents 2, 4, and 5 were found to corrode the epoxy adhesive site of the inkjet head. Namely, there is the concern that these inks are not suitable for continuous long-term use with the inkjet printing method.

As stated above, when using a C.I. pigment blue 15:6 to prepare an active energy ray curable blue ink as the coloring material, there has been difficulty in finely dispersing the coloring material to the level required in order to obtain an inkjet ink having a high color reproducibility, maintaining that state over a long period of time, and, actually maintaining a good discharge performance.

PRIOR ART DOCUMENTS

Patent Documents

Patent Document 1: JP 2009-197173 A
Patent Document 2: JP 2017-177353 A
Patent Document 3: JP 2017-171789 A
Patent Document 4: WO 2018/105355
Patent Document 5: WO 2018/131400
Patent Document 6: JP 2009-285904 A
Patent Document 7: JP 2012-030399 A

SUMMARY OF THE INVENTION

Problems Invention Aims to Solve

In order to solve the aforementioned problems, it is the object of the present invention to provide an active energy ray curable inkjet ink which can suitably reproduce the color of the blue region. More specifically, the aforementioned active energy ray curable inkjet ink improves the initial dispersibility, the dispersion stability during long-term storage, and the discharge stability, and realizes a low corrosion (low permeability) in the epoxy adhesive used in the inkjet head. Further, the present invention provides an active energy ray curable ink set comprising the active energy ray curable inkjet ink having an excellent color clarity and color development, and can obtain a printed matter in which the color reproducibility in the green, blue and red regions is good.

Means for Solution of the Problems

In view of the aforementioned situation, the present inventors performed keen research, and as a result discovered that the aforementioned problem could be solved by an active energy ray curable inkjet ink having a specific structure, and, an active energy ray curable ink set comprising this active energy ray curable inkjet ink, and completed the present invention.

Namely, the present invention relates to the following embodiments. However, the present invention is not limited to the following embodiments, and includes numerous embodiments.

One embodiment relates to an active energy ray curable inkjet ink comprising a pigment (A), a colorant derivative (B), a pigment dispersing resin (C) and a polymerizable compound (D), wherein the aforementioned pigment (A) contains a C.I. pigment blue 15:6 and a quinacridone-based pigment, the total mass of the blending amount of the C.I. pigment blue 15:6 and the blending amount of the quinacridone-based pigment is from 2 to 10% by mass based on the total mass of the ink, the mass ratio of the C.I. pigment blue 15:6 and the quinacridone-based pigment is from 3:1 to 1:3, the aforementioned colorant derivative (B) contains a quinacridone-based pigment derivative, and satisfying the relationship $C1 \geq C2 > 0$ when the acid value of the aforementioned pigment dispersing resin (C) is denoted as C1 (mgKOH/g) and the amine value of the aforementioned pigment dispersing resin (C) is denoted as C2 (mgKOH/g).

A preferred embodiment relates to the aforementioned active energy ray curable inkjet ink, wherein the aforementioned polymerizable compound (D) contains from 20 to 60% by mass of 2-(2-vinyloxyethoxy) ethyl acrylate based on the total mass of the inkjet ink.

A preferred embodiment relates to the aforementioned active energy ray curable inkjet ink further comprising a photopolymerization initiator (E), and comprises at least one type of α-hydroxyacetophenone photopolymerization initiator (E-1) as the photopolymerization initiator (E).

Another embodiment relates to an active energy ray curable ink set comprising the active energy ray curable inkjet ink of the aforementioned embodiment, an active energy ray curable inkjet yellow ink and an active energy ray curable inkjet magenta ink.

Another embodiment relates to a printed matter obtained by printing the active energy ray curable inkjet ink of the aforementioned embodiment, or, the active energy ray curable ink set of the aforementioned embodiment on a recording medium.

The disclosure of the present application relates to the subject matter described in Japanese Patent Application No. 2019-230092 filed on Dec. 20, 2019, the disclosed contents of which are incorporated herein for reference.

Effects of the Invention

The present invention can provide an active energy ray curable inkjet ink which can satisfactorily reproduce the color of the blue region. The active energy ray curable inkjet ink according to the present invention can improve all of the initial dispersibility, the dispersion stability during long-term storage, the discharge stability, and the corrosion to the epoxy adhesive used in the inkjet head. Further, an active energy ray curable ink set containing the aforementioned active energy ray curable inkjet ink can be provided by which a printed matter having excellent color clarity and color development, and a satisfactory color reproducibility over the green, blue and red regions can be obtained.

EMBODIMENTS FOR CARRYING OUT THE INVENTION

The embodiments of the present invention will be described in detail below. <1>Active Energy Ray Curable Inkjet Ink As explained above, it is known that the C.I. pigment blue 15:6 contained in the active energy ray curable inkjet ink which is one embodiment of the present invention has an excellent color reproducibility in the blue region. It is also known that the C.I. pigment blue 15:6 can be adjusted to a desired color by appropriately combining with other pigments.

When producing the active energy ray curable inkjet ink, a coloring material such as a pigment is used in combination with a suitable dispersant, and is used in a form dispersed in a polymerizable compound. Generally, a pigment dispersing resin is used as the dispersant. When a pigment dispersing resin is used, the functional groups present in the molecular structure of the pigment dispersing resin interact with the pigment surface, so that the pigment dispersing resin is adsorbed on the pigment surface. On the other hand, the dispersion state is stabilized by a structure portion other than the functional group forming a steric hinderance between the pigment particles. In the case of C.I. pigment blue 15:6, there are many nitrogen atoms in the molecular structure, thus, a pigment dispersing resin having an acid group such as a carboxyl group has been used as the aforementioned functional group.

On the other hand, the present inventors performed keen investigation, and as a result, discovered that the functional group of the aforementioned pigment dispersing resin in the ink, specifically, the acid groups are a factor causing the corrosion action at the site of the epoxy adhesive used in the inkjet head. Further, the type of polymerizable compound in the ink which will be described later may also cause the corrosion action to the aforementioned epoxy adhesive site. Moreover, as the result of this corrosive action, there is the technical problem that the durable life of the inkjet head decreases.

In order to prevent the aforementioned problems, it is also possible to use a dispersant which does not have an acid group. However, as stated above, when C.I. pigment blue 15:6 was used as the coloring material, specifically, the dispersion stability of the pigment is insufficient, and, an improvement has been desired in long-term dispersion stability, and inkjet discharge applicability. As stated above, satisfying all of the properties of the initial dispersion stability, the long-term dispersion stability, the inkjet discharge applicability, and furthermore, a low corrosiveness to the epoxy adhesive used in the inkjet head at a practical level is a major challenge for a person having an ordinary skill in the art.

Under such circumstances, as the result of performing keen research, the present inventors discovered that an active energy ray curable inkjet ink which combined all of the properties of the initial dispersion stability, the long-term dispersion stability, the inkjet discharge applicability, and a low corrosiveness to the epoxy adhesive could be provided by dispersing a C.I. pigment blue 15:6 and a quinacridone-based pigment in the presence of a pigment dispersing resin (C) having a specific range of acid values and amine values and a quinacridone-based pigment derivative.

The active energy ray curable inkjet ink (hereinafter, referred to as the ink) which is one embodiment of the present invention contains the C.I. pigment blue 15:6 and quinacridone-based pigment as the pigment (A). As stated above, a plurality of pigments may be used in combination in order to obtain the intended color, but the present invention is characterized by a combination of the C.I. pigment blue 15:6 and the quinacridone-based pigment. It is thought that both of the C.I. pigment blue 15:6 and the quinacridone-based pigment have a plurality of aromatic rings and nitrogen atoms in the molecular structure, and thus, the affinity between the two is high. As a result, even during long-term storage, both of the C.I. pigment blue 15:6 and the quinacridone-based pigment can maintain a high dispersion stability without separation.

Further, as the result of performing keen research, the present inventors discovered that both color reproducibility and dispersion stability could be realized by adjusting the ratio of the blending amount of the C.I. pigment blue 15:6 and the blending amount of the quinacridone-based pigment. Namely, from the viewpoint of realizing an excellent color reproducibility and dispersion stability, in one embodiment, the total mass of the blending amount of the C.I. pigment blue 15:6 and the blending amount of the quinacridone-based pigment is preferably 3% by mass or more based on the total mass of the ink. Furthermore, the mass ratio of the C.I. pigment blue 15:6 and the quinacridone-based pigment is preferably set from 3:1 to 1:3.

In addition to the aforementioned pigment (A), the ink of the aforementioned embodiment contains a pigment dispersing resin (C) having a specific range of acid values and amine values, and, a colorant derivative (B). By use of these materials in combination, it is possible to construct an ink which combined all of the dispersion stability, the inkjet discharge applicability and the low corrosiveness to the epoxy adhesive.

In the aforementioned ink, a basic group present in the pigment dispersing resin (C) is adsorbed to the acid group of the free pigment dispersing resin which does not adsorb to the pigment. It is thought that the corrosiveness to the epoxy adhesive is mitigated without impairing the dispersion stability thereby. However, compared to the acid group, if the basic group is present in excess, the adsorption of the pigment dispersing resin to the pigment may be inhibited. Therefore, the pigment dispersing resin (C) preferably satisfies the relationship $C1 \geq C2 > 0$ when the acid value of the pigment dispersing resin (C) is denoted as C1 (mgKOH/g), and the aforementioned amine value of the pigment dispersing resin (C) is denoted as C2 (mgKOH/g).

On the other hand, a colorant derivative (B) is used for the improvement of the dispersion stability. Generally, the colorant derivative (B) preferably has the same structure as the pigment which is used in combination. In the case of the ink of the aforementioned embodiment, even a copper phthalocyanine-based pigment derivative is thought to be effective in the improvement of the dispersion stability. However, the present inventors discovered that an ink having a more excellent inkjet discharge applicability and low corrosiveness to the epoxy adhesive could be obtained when the quinacridone-based pigment derivative was used.

The quinacridone-based structure is different than a phthalocyanine-based structure, in that a hydrogen atom is bound to a nitrogen atom. Therefore, it is thought to be easy to form hydrogen bonds with the acid groups present in the pigment molecules and the pigment dispersing resin. As a result, it is thought that the quinacridone-based structure bonds more strongly to the pigment molecules and the pigment dispersing resin than by adsorption due to the structural similarities. While not bound by theory, from these facts, it is thought that the particular improvement of the dispersion stability, and furthermore, the improvement of the discharge applicability by optimization of the viscoelasticity can be realized. Further, the reason that the corrosiveness to the epoxy adhesive is reduced is not clear, but it is assumed that the corrosion to the epoxy adhesive is mitigated by the quinacridone-based pigment derivative being adsorbed to the acid groups of the free pigment dispersing resin which is not adsorbed with the pigment without impairment to the dispersion stability.

As stated above, the active energy ray curable inkjet ink which satisfies all of characteristics such as the initial dispersion stability, the long-term dispersion stability, the inkjet discharge applicability, and the low corrosiveness to the epoxy adhesive can be realized by the configuration of the ink of the embodiment of the present invention.

Furthermore, the present inventors discovered that when 2-(2-vinyloxyethoxy) ethyl acrylate was used as the polymerizable compound (D) used with the ink, the corrosiveness to the epoxy adhesive could be further reduced, and the long-term dispersion stability of the pigment was improved.

2-(2-vinyloxyethoxy) ethyl acrylate is a material having an ethylene oxide group and a vinyl group in the molecular structure, and contributes to the low viscosity and the high reactivity of the ink. However, as both groups are nucleophilic, there is the possibility of affecting the deterioration of the dispersion stability. Further, the surface tension at 25° C. is approximately 34 mN/m, and because the surface tension is low, there is the risk of causing a corrosion effect to the epoxy adhesive site in the inkjet head.

With respect thereto, in the embodiment of the present invention, it is thought that the deterioration of the dispersion stability is prevented by the basic group contained in the pigment dispersing resin (C) forming a weak interaction with the ethylene oxide group and the vinyl group. On the other hand, while the reason that the corrosiveness to the epoxy adhesive is reduced when 2-(2-vinyloxyethoxy) ethyl acrylate was used is not clear, it is thought that the corrosion effect to the epoxy adhesive site of the inkjet head is suppressed by generating the interaction with an aromatic ring and the like present in the pigment within the ink.

In one embodiment, the photopolymerization initiator (E) is blended in the ink when the active energy ray curable inkjet ink is cured with ultraviolet irradiation. As described below, the type of photopolymerization initiator which can be used is not specifically limited, and well-known photopolymerization initiators can be used. Among them, an active energy ray curable inkjet ink in which an a-hydroxyacetophenone photopolymerization initiator (E-1) was blended may be provided as a preferred embodiment. This ink is particularly excellent in terms of easily obtaining the long-term dispersion stability and the excellent discharge stability.

When including an α-hydroxyacetophenone photopolymerization initiator (E-1) as the photopolymerization initiator (E), the long-term dispersion stability and an excellent discharge stability can be easily obtained. It is thought that the reason this occurs is because the hydroxy groups present in the initiator form hydrogen bonds with the functional groups on the pigment surface. The formation of the hydrogen bonds assists in the effect of maintaining a stable pigment dispersing in the system, and as a result, it is assumed that pigment coagulation is suppressed, and the discharge stability from the inkjet head improves.

Each component constituting the active energy ray curable inkjet ink will be described below.

<Pigment (A)>

The active energy ray curable inkjet ink contains both the C.I. pigment blue 15:6 and the quinacridone-based pigment. Commercially available products can be used for both of these. The quinacridone-based pigment which can be used is not specifically limited. Examples include C.I. pigment red 122, 202, 209, and 282, and C.I. pigment violet 19 and the like. These may be used alone, or two or more may be used together.

From the viewpoint of attaining both color reproducibility and dispersion stability, the specific surface area of the C.I. pigment blue 15:6 is preferably from 30 to 150 $m^2/g$, and more preferably from 50 to 100 $m^2/g$. The aforementioned specific surface area is a value measured by the BET method.

The present inventors performed keen research, and as a result discovered that the bulk density of the C.I. pigment blue 15:6 in a solid state is preferably 0.5 kg/l or less, and more preferably 0.3 kg/l or less. The detailed reasons are unknown, but the bulk density is a value that, in addition to the volume of the pigments themselves, takes the volume of the voids formed by the aforementioned pigments themselves into account. Therefore, it is thought that the bulk density can be used as an index which can comprehensively determine the dispersion state of the pigment. The bulk density is a value measured by a constant-volume measuring method.

In one embodiment, the blending amount of the total mass of the C.I. pigment blue 15:6 and the blending amount of the quinacridone-based pigment may be from 2 to 10% by mass, and preferably from 3 to 6% by mass relative to the total mass of the aforementioned active energy ray curable inkjet ink. According to this embodiment, the printed matter having excellent color reproducibility can be easily obtained. Further, the dispersion stability of the ink can be easily maintained. Furthermore, in addition to the aforementioned embodiment, as stated above, the mass ratio of the aforementioned C.I. pigment blue 15:6 and the aforementioned quinacridone-based pigment is preferably from 3:1 to 1:3.

In addition to the C.I. pigment blue 15:6, and, the quinacridone-based pigment, the active energy ray curable inkjet ink may use pigments (hereinafter, referred to as the "other pigments") other than these. A phthalocyanine-based pigment such as C.I. pigment blue 15:3, 15:4 and 16, and C.I. pigment green 7 and 36 can be used, the phthalocyanine-based pigment is the same type as the C.I. pigment blue 15:6. Further, a benzimidazolone-based pigment having a partial structure similar to the aforementioned C.I. pigment blue 15:6 such as C.I. pigment red 175, 176, 185 and 208, and C.I. pigment yellow 120, 151, 154, 175, 180, 181 and 194 may be used. However, when using other pigments, the blending amount is preferably in the range which does not impair the effect of the C.I. pigment blue 15:6 and the quinacridone-based pigment. Specifically, the blending amount of the other pigments is preferably 50% by mass or less, and more preferably 30% by mass or less based on the total mass of pigment (A).

<Colorant Derivative (B)>

The colorant derivative (B) used in the active energy ray curable inkjet ink is a pigment derivative having a quinacridone skeleton. Specifically, a compound represented by the following general formulae (1) to (3) in which the quinacridone pigment is used as the basic skeleton and in which a substituent was introduced into the molecule may be provided.

General formula (1):

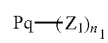

[Formula 1]

In general formula (1), Pq represents an $n_1$-valent quinacridone residue, $n_1$ represents an integer of 1 or more, and $Z_1$ represents $SO_3H$ or COOH. $n_1$ is preferably 1 to 5, more preferably 1 to 3, and even more preferably 1 or 2.

General formula (2):

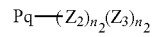

[Formula 2]

In general formula (2), Pq represents an $n_2$-valent quinacridone residue, $n_2$ represents an integer of 1 or more, $Z_2$ represents $SO_3^-$ or $COO^-$, $Z_3$ represents an alkaline metal cation, a primary amine cation, a secondary amine cation, a tertiary amine cation, or a quaternary ammonium cation.

$n_2$ is preferably 1 to 5, more preferably 1 to 3, and even more preferably 1 or 2.

General formula (3):

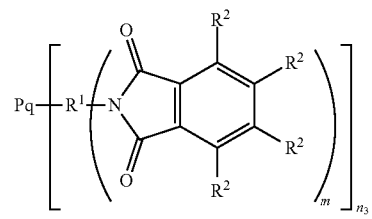

[Formula 3]

In general formula (3), Pq represents an $n_3$-valent quinacridone residue, $n_3$ represents an integer of 1 or more, m represents an integer of 1 or more, $R^1$ represents an (m+1)-valent organic residue, $R^2$ represents hydrogen atom, halogen atom, or an alkyl group of 1 to 10 carbon atoms, and the plurality of $R^2$ may be the same or different.

$n_3$ is preferably 1 to 5, more preferably 1 to 3, and even more preferably 1 or 2.

Further, $R^1$ is preferably a methylene group, and all of the $R^2$ are preferably hydrogen atom.

In the aforementioned general formulae (1) to (3), specific examples of the quinacridone residue represented by Pq include residue derived from unsubstituted quinacridone, monomethyl quinacridone, dimethyl quinacridone, monochloro quinacridone, dichloro quinacridone, monomethoxy quinacridone and dimethoxy quinacridone.

The aforementioned colorant derivative may be produced by a method described in, for example, JP S46-10069 A, JP S50-4019 A, JP S53-13651 A and JP S55-108466 A. Among the aforementioned colorant derivatives, a colorant derivative represented by general formula (1) or (2) is preferable. A compound in which $Z_1$ is $SO_3H$ in the aforementioned general formula (1), or, a compound in which $Z_2$ is $SO_3^-$ in the aforementioned general formula (2) is more preferable. Furthermore, the compounds represented by the following general formulae (4) and (5) are particularly preferable.

General formula (4):

[Formula 4]

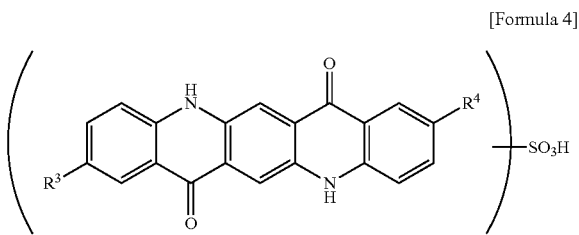

In general formula (4), $R^3$ and $R^4$ independently represent hydrogen atom or a methyl group.

General formula (5):

[Formula 5]

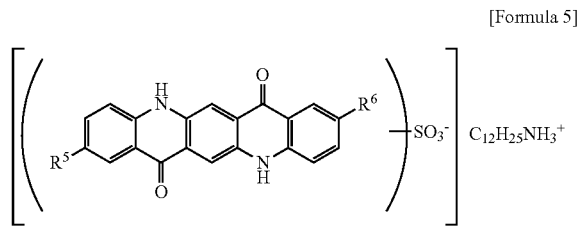

In general formula (5), $R^5$ and $R^6$ independently represent hydrogen atom or a methyl group.

In the aforementioned embodiment, the colorant derivative (B) not only assists in the dispersion of the quinacridone-based pigment, but also adsorbs the acid group of the free pigment dispersing resin which is not adsorbed with the pigment. Therefore, it is assumed that the components within the ink have the effect which mitigates the corrosion effect to the epoxy adhesive site in the inkjet head. From the viewpoint of obtaining this kind of effect, the blending amount of the aforementioned colorant derivative (B) is preferably from 1 to 20% by mass, and more preferably from 2 to 10% by mass relative to the total amount of the pigment contained in the aforementioned active energy ray curable inkjet ink.

<Pigment Dispersing Resin (C)>

A pigment dispersing resin (C) is used in the ink of the aforementioned embodiment for the initial dispersibility and the long-term dispersion stability of the pigment. The pigment dispersing resin (C) to be used preferably satisfies the relationship $C1>C2>0$ when the acid value of the pigment dispersing resin (C) is denoted as C1 (mgKOH/g), and the amine value of the pigment dispersing resin (C) is denoted as C2 (mgKOH/g).

From the viewpoint of being able to easily improve the initial dispersibility of the pigment, in one embodiment, the acid value of the pigment dispersing resin (C) may be from 30 to 135 (mgKOH/g), more preferably from 35 to 132 (mgKOH/g), and even more preferably from 35 to 80 (mgKOH/g). Further, the amine value is preferably from 15 to 100 (mgKOH/g), more preferably from 20 to 75 (mgKOH/g), and even more preferably from 30 to 74 (mgKOH/g).

In addition, the difference (value of $C1-C_2$) of C1 and C2 is preferably from 0 to 80, and particularly preferably from 0 to 50. If the value of C1-C2 is within the aforementioned range, the corrosion effect of the ink to the epoxy adhesive can be satisfactorily prevented, and the dispersion stability can be suitably maintained.

In the specification of the present invention, the term "acid value" represents the acid value per 1 g of the solid fraction of the pigment dispersing resin (C), and indicates the value obtained by potentiometric titration in accordance with JIS K 0070. The "amine value" represents the amine value per 1 g of the solid fraction of the pigment dispersing resin (C), and indicates the value determined by performing potentiometric titration using a 0.1 N aqueous solution of hydrochloric acid, and then converting the result to an equivalent weight of potassium hydroxide.

A commercially available product can be used as the pigment dispersing resin (C). A resin synthesized by a well-known method may also be used. Specific examples of commercially available products include Disperbyk (registered trademark) 145 and 106 manufactured by BYK Chemie, and Solsperse (registered trademark) J-180 and the like manufactured by The Lubrizol Corporation. Further, the resin may be obtained by co polymerizing an acid group-containing monomer such as acrylic acid and methacrylic acid, an amino group-containing monomer such as acrylamide and diethylaminoethyl methacrylate, and other monomers in according to need in an organic solvent, and furthermore, a resin in which the acid value and the amine value satisfy the aforementioned conditions may be used as the pigment dispersing resin (C).

From the viewpoint of attaining the dispersibility and the low corrosiveness to the epoxy adhesive for both of the C.I. pigment blue 15:6 and the quinacridone-based pigment, a comb pigment dispersing resin in which the main chain is a polyamine or polyimine is preferably used in the ink of the aforementioned embodiment. A comb pigment dispersing resin in which the main chain is a polyamine is particularly preferably used. Specific examples of the aforementioned polyamine include polyvinyl amine and polyallylamine. Specific examples of the aforementioned polyimine include polyethyleneimine and polypropyleneimine. Note that, among the above listed commercially available products, Disperbyk (registered trademark)-145 and Solsperse (registered trademark) J-180 may be used as the comb pigment dispersing resin in which the main chain is a polyamine or polyimine. For example, the method disclosed in JP 2003-531001 A may be used when synthesizing the aforementioned comb pigment dispersing resins in which the main chain is a polyamine or polyimine.

The amount added of the pigment dispersing resin (C) is preferably from 20 to 100% by mass, and more preferably from 30 to 80% by mass relative to the total mass of the aforementioned pigment (A). When the amount added of the pigment dispersing resin (C) was adjusted to within the aforementioned range, the initial dispersibility becomes good. Furthermore, the deterioration of the discharge stability due to the influence of the pigment dispersing resin (C) which is not adsorbed with the pigment improves, and, the corrosion effect to the epoxy adhesive site of the inkjet head can be reduced.

<Polymerizable Compound (D)>

In the ink of the aforementioned embodiment, the polymerizable compound (D) has the functios which causes a polymerization or a crosslinking reaction by an initiating species such as a radical generated from a photopolymerization initiator which will be described later, and which cures a composition comprising the above components.

There are no particular limitations on the polymerizable compound (D) as long as it has the aforementioned properties, and any type of a monomer, oligomer or polymer may be used. The terms "oligomer" and "polymer" are polymers in which a plurality of monomers is bonded, and both are classified according to the degree of polymerization. In the specification of the present invention, an "oligomer" is referred to as a compound in which the degree of polymerization is from 2 to 5, and a "polymer" is referred to as a compound in which the degree of polymerization is 6 or more.

Examples of the polymerizable group having a polymerizable compound (D) include a (meth)acrylate group, a vinyl ether group, an allyl group, a vinyl group (however, the vinyl ether group and the allyl group are excluded), and an unsaturated carboxylic acid group.

In one embodiment, a (meth)acrylate compound is preferably used as the polymerizable compound (D).

The polymerizable compound (D) may be a monofunctional polymerizable compound, and may be a polyfunctional (difunctional or greater) polymerizable compound. A single polymerizable compound (D) or a mixture of a plurality of polymerizable compounds (D) may be used for the purpose of adjusting the reaction rate and the physical properties of a cured film and the physical properties of the ink. When the ratio of the monofunctional polymerizable compound is high, a flexible cured film tends to be easily obtained. When the ratio of the polyfunctional polymerizable compound is high, an excellent curability tends to be easily obtained. From the viewpoint of obtaining the above-stated properties, when using a plurality of polymerizable compound (D), the ratio of the monofunctional polymerizable compound and the polyfunctional polymerizable compound is arbitrarily determined in accordance with the application.

In the specification of the present invention, the terms "(meth)acrylate" and "(meth)acrylic" mean "acrylate and/or methacrylate" and "acryloyl and/or methacryloyl" respectively. In the specification of the present invention, the term "monofunctional" refers to a compound having only one polymerizable group in a molecule. Further, the terms "difunctional" and "trifunctional" respectively refer to compounds having 2 or 3 polymerizable groups 1 in a molecule, and compounds which are difunctional or more will be collectively referred to as "polyfunctional".

Examples of monofunctional (meth)acrylate compounds include benzyl (meth)acrylate, 2-phenoxyethyl (meth)acrylate, (ethoxylated or propoxylated) 2-phenoxyethyl (meth) acrylate, dicyclopentenyl (oxyethyl) (meth)acrylate, phenoxy diethylene glycol (meth)acrylate, 2-methoxethyl (meth)acrylate, methoxy triethylene glycol (meth)acrylate, 2-ethoxyethyl (meth)acrylate, 2-(2-ethoxyethoxy) ethyl (meth)acrylate, methoxy dipropylene glycol (meth)acrylate, dipropylene glycol (meth)acrylate, nonylphenol EO-modified acrylate, nonylphenol PO-modified acrylate, o-phenylphenol EO-modified acrylate, 2-ethylhexyl EO-modified acrylate, β-carboxyethyl (meth)acrylate, trimethylolpropane formal (meth)acrylate, isoamyl (meth)acrylate, cyclohexyl (meth)acrylate, tetrahydrofurfuryl (meth)acrylate, isobornyl (meth)acrylate, norbornyl (meth)acrylate, dicyclopentanyl (meth)acrylate, isononyl (meth)acrylate, stearyl (meth)acrylate, n-octyl acrylate, isooctyl (meth)acrylate, lauryl (meth) acrylate, isodecyl (meth)acrylate, tridecyl (meth)acrylate, caprolactone (meth)acrylate, 2-hydroxy-3-phenoxypropyl (meth)acrylate, 1,4-cyclohexanedimethanol (meth)acrylate, 2-hydroxyethyl (meth)acrylate, 2-hydroxypropyl (meth) acrylate, 4-hydroxybutyl (meth)acrylate, acryloylmorpholine and N-acryloyloxyethyl hexahydrophthalimide.

Examples of compounds having two (meth)acryloyl groups (difunctional (meth)acrylate compounds) include 1,6-hexanediol di(meth)acrylate, ethoxylated (or propoxylated) 1,6-hexanediol di(meth)acrylate, 1,10-decanediol di(meth)acrylate, neopentyl glycol di(meth)acrylate, 2,4-dimethyl-1,5-pentanediol di(meth)acrylate, 3-methyl-1,5-pentanediol di(meth)acrylate, butylethylpropanediol (meth) acrylate, ethoxylated cyclohexanemethanol di(meth) acrylate, polyethylene glycol di(meth)acrylate, oligoethylene glycol di(meth)acrylate, ethylene glycol di(meth)acrylate, polyethylene glycol di(meth)acrylate, 2-ethyl-2-butylbutanediol di(meth)acrylate, hydroxypivalic acid neopentyl glycol di(meth)acrylate, EO-modified bisphenol A di(meth)acrylate, bisphenol F polyethoxy di(meth) acrylate, polypropylene glycol di(meth)acrylate, oligopropylene glycol di(meth)acrylate, 1,4-butanediol di(meth) acrylate, 2-ethyl-2-butylpropanediol di(meth)acrylate, 1,9-nonane di(meth)acrylate, propoxylated ethoxylated bisphenol A di(meth)acrylate, propoxylated bisphenol A di(meth)acrylate, ethoxylated bisphenol A di(meth)acrylate, ethoxylated bisphenol F di(meth)acrylate, isocyanuric acid EO-modified diacrylate, tricyclodecane di(meth)acrylate, dipropylene glycol di(meth)acrylate, tripropylene glycol di(meth)acrylate, PO-modified neopentyl glycol di(meth) acrylate, EO-modified neopentyl glycol di(meth)acrylate, dimethyloltricyclodecane di(meth)acrylate, cyclohexanedimethanol di(meth)acrylate, trimethylolpropane di(meth) acrylate, neopentyl glycol-modified trimethylolpropane di(meth)acrylate and dicyclopentanyl di(meth)acrylate.

Further, examples of the difunctional polymerizable compound having one (meth)acryloyl group and one vinyl ether group include 2-(2-vinyloxyethoxy) ethyl acrylate, 2-(2-vinyloxyethoxy) ethyl methacrylate and the like.

Examples of trifunctional (meth)acrylate compound include trimethylolpropane tri (meth)acrylate, trimethylolethane tri (meth)acrylate, alkylene oxide-modified tri (meth) acrylates of trimethylolpropane (such as trimethylolpropane EO-modified triacrylate and trimethylolpropane PO-modified triacrylate), tetramethylolmethane tri (meth)acrylate, pentaerythritol tri (meth)acrylate, dipentaerythritol tri (meth)acrylate, trimethylolpropane tri ((meth)acryloyloxypropyl) ether, isocyanuric acid alkylene oxide-modified tri (meth)acrylates, propionic acid dipentaerythritol tri (meth) acrylate, tri ((meth)acryloyloxyethyl) isocyanurate, hydroxypivalaldehyde-modified dimethylolpropane tri (meth)acrylate, sorbitol tri (meth)acrylate, propoxylated trimethylolpropane tri (meth)acrylate, ethoxylated glycerol triacrylate and propoxylated glyceryl triacrylate. From the point of the curability, at least one selected from the group consisting of trimethylolpropane tri (meth)acrylate and trimethylolpropane EO-modified triacrylate is preferably included.

Examples of tetrafunctional (meth)acrylate compound include pentaerythritol tetra (meth)acrylate, sorbitol tetra (meth)acrylate, ditrimethylolpropane tetra (meth)acrylate, propionic acid dipentaerythritol tetra(meth)acrylate, ethoxylated pentaerythritol tetra(meth)acrylate and tetramethylolmethane tetra (meth)acrylate. Among them, pentaerythritol tetraacrylate is preferable.

Examples of the pentafunctional (meth)acrylate compound include sorbitol penta (meth)acrylate and dipentaerythritol penta (meth)acrylate.

Examples of the hexafunctional (meth)acrylate compound include dipentaerythritol hexa (meth)acrylate, sorbitol hexa (meth)acrylate, alkylene oxide-modified hexa (meth)acrylates of phosphazene and &-caprolactone-modified dipentaerythritol hexa (meth)acrylate. Among them, dipentaerythritol hexaacrylate is preferable.

In the specification of the term "EO" refers to "ethylene oxide" and the term "PO" refers to "propylene oxide".

As stated above, from the viewpoint of further reducing the corrosive to the epoxy adhesive, and, improving the long-term dispersion stability of the pigment, 2-(2-vinyloxyethoxy) ethyl acrylate in the ink is preferably used in the ink of the aforementioned embodiment. One embodiment preferably includes from 20 to 60% by mass of (meth) 2-(2-vinyloxyethoxy) ethyl acrylate relative to the total mass of the ink. This embodiment can easily obtain both of the effects of the improvement of the long-term dispersion stability and the reduction of the corrosive to the epoxy adhesive to a good level.

In the preferred embodiment, the polymerizable compound (D) is preferably two or more types selected from the group consisting of dipropylene glycol diacrylate, 1,6-hexanediol di(meth)acrylate, and, 2-(2-vinyloxyethoxy) ethyl acrylate.

Further, in the preferred embodiment, the blending amount of the difunctional polymerizable compound is preferably 65% by mass or more, even more preferably 85% by mass or more, and 95% by mass or more is particularly preferable relative to the total mass of the polymerizable compound (D). This embodiment can obtain a good effect in all of the properties of the dispersibility, the discharge stability, and, the low corrosiveness to the epoxy adhesive of the pigment, and can furthermore obtain a good effect from the viewpoint of the curability of the ink and the abrasion resistance of the cured film.

<Photopolymerization Initiator (E)>

When curing the ink of the aforementioned embodiment with ultraviolet rays, a photopolymerization initiator is preferably blended in the ink. The photopolymerization initiator (E) may be a well-known photopolymerization initiator, and for example, the use of a photopolymerization initiator that generates radicals by molecular cleavage or hydrogen abstraction is preferred. The photopolymerization initiator (E) may be used alone, or a combination of two or more photopolymerization initiators (E) may be used. Further, a combination of a photopolymerization initiator that generates radicals and a photopolymerization initiator that generates cations may also be used.

Specific examples of the photopolymerization initiator (E) include the following:

- a benzyl dimethyl ketal-based photopolymerization initiator such as 2,2-dimethoxy-1,2-diphenylethan-1-one ("OMNIRAD BDK" manufactured by IGM RESINS B. V.);
- an α-hydroxyalkylphenone-based photopolymerization initiator such as 1-hydroxy-cyclohexyl-phenyl-ketone ("OMNIRAD 184" manufactured by IGM RESINS B. V.);
- an α-hydroxyacetophenone photopolymerization initiator such as 2-hydroxy-2-methyl-1-phenyl-propane-1-one ("OMNIRAD 1173" manufactured by IGM RESINS B. V.), 1-[4-(2-hydroxyethoxy)-phenyl]-2-hydroxy-2-methyl-1-propane-1-one ("OMNIRAD 659" manufactured by IGM RESINS B. V.), 2-hydroxy-1-{4-[4-(2-hydroxy-2-methyl-propionyl)-benzyl]-phenyl}-2-methyl-propane-1-one ("OMNIRAD 127" manufactured by IGM RESINS B. V.), and oligo (2-hydroxy-2-methyl-1-(4-(1-methyl vinyl)phenyl) propane) ("ESACURE ONE" and "ESACURE KIP 160" manufactured by IGM RESINS B. V.);
- an α-aminoalkylphenone-based photopolymerization initiator such as 2-methyl-1-[4-(methylthio)phenyl]-2-morpholinopropane-1-one ("OMNIRAD 907" manufactured by IGM RESINS B. V.), 2-benzyl-2-dimethylamino-1-morpholinophenyl)-butanone-1 ("OMNIRAD 369" manufactured by IGM RESINS B. V.), and 2-dimethylamino-2-(4-methylbenzyl)-1-(4-morpholinophenyl)-1-butanone ("OMNIRAD 379" manufactured by IGM RESINS B. V.);
- an acylphosphine oxide-based photopolymerization initiator such as bis(2,4,6-trimethylbenzoyl)-phenylphosphine oxide ("OMNIRAD 819" manufactured by IGM RESINS B. V.), 2,4,6-trimethylbenzoyl-diphenylphosohine oxide ("OMNIRAD TPO" manufactured by IGM RESINS B. V.), and ethyl (2,4,6-trimethylbenzoyl)-phenylphosphine oxide ("OMNIRAD TPO-L" manufactured by IGM RESINS B. V.); and oligo (2-hydroxy-2-methyl-1-(4-(1-methylvinyl)phenyl) propanone) (ESACURE ONE and ESACURE KIP150 manufactured by Lamberti S.p.A.);
- an intramolecular hydrogen abstraction photopolymerization initiator such as phenylglyoxylic acid methyl ester ("OMNIRAD MBF" manufactured by IGM RESINS B. V.);
- an oxime ester-based photopolymerization initiator such as 1,2-octanedione-1-[4-(phenylthio)-2-(o-benzoyloxime) ("IRGACURE OXE01" manufactured by BASF Corporation) and ethanone-1-[9-ethyl-6-(2-methylbenzoyl)-9H-carbazol-3-yl]-1-(O-acetyloxime) ("IRGACURE OXE02" manufactured by BASF Corporation); and
- a benzophenone-based photopolymerization initiator such as benzophenone, 4-phenylbenzophenone, isophthalphenone, 4-benzoyl-4'-methyl-diphenyl sulfide ("OMNIRAD BMS" manufactured by IGM RESINS B. V.), and 1-[4-(4-benzoylphenylsulfanyl)phenyl]-2-methyl-2-(4-methylphenylsulfonyl) propan-1-one ("ESACURE 1001M" manufactured by IGM RESINS B. V.).

In one embodiment, from the viewpoint of the long-term dispersion stability of the pigment and the discharge stability of the inkjet, the α-hydroxyacetophenone photopolymerization initiator (E-1) is preferably used. From the viewpoint of appropriately obtaining the desired effect, the blending amount of the aforementioned α-hydroxyacetophenone photopolymerization initiator (E-1) is preferably in the range from 1 to 12% by mass, and more preferably in the range from 1 to 8% by mass relative to the total mass of the ink.

<Other Components>

In the active energy ray curable inkjet ink of the aforementioned embodiment, in addition to the aforementioned components, a polymerization inhibitor, solvents, surface modifiers, and if necessary other additives may be used in combination.

<Polymerization Inhibitor>

A polymerization inhibitor may be used to enhance the viscosity stability of the ink over time, the discharge stability over time, and the viscosity stability upon storage inside an inkjet recording apparatus. Hindered phenol-based compounds, phenothiazine-based compounds, hindered amine-based compounds and phosphorus-based compounds can be used particularly favorably as the polymerization inhibitor. Specific examples include 4-methoxyphenol, hydroquinone, methylhydroquinone, t-butylhydroquinone, 2,6-di-t-butyl-4-methylphenol, phenothiazine and aluminum salts of N-nitrosophenylhydroxylamine. From the viewpoint of maintaining good curability while enhancing the stability over time, the blending amount of the polymerization inhibitor is preferably from 0.01 to 2% by mass and more preferably from 0.1 to 1% by mass relative to the total mass of the ink.
<Solvent>

The ink of the aforementioned embodiment may include a solvent in order to reduce the viscosity of the ink and improve the wet spreadability on the recording medium. The solvent may be at least one type selected from the group consisting of water and an organic solvent. In one embodiment, the solvent preferably includes at least an organic solvent. An embodiment of the ink which includes an organic solvent is described below. However, a part or all of the organic solvent may be substituted with water.
(Organic Solvent)

By adding an organic solvent to the ink of the aforementioned embodiment, the viscosity of the ink can be easily reduced, and the wet spreadability on the recording medium can be easily improved. The organic solvent is not specifically limited, however the blending amount of the organic solvent is preferably from 0.01 to 30% by mass, more preferably from 0.05 to 20% by mass, and even more preferably from 0.1 to 10% by mass based on the total mass of the ink. Further, from the viewpoint of the drying property and the wet spreadability on the recording medium, an organic solvent having a boiling point from 140 to 300° C. is preferably used.

Examples of the organic solvent which may be used include alkylene glycol monoalkyl ether monoacetates, alkylene glycol diacetates, alkylene glycol monoalkyl ethers, alkalkanediols, alkylene glycol dialkyl ethers, lactams, and lactones. Nitrogen-containing organic solvents and oxygen-containing organic solvents in addition to these may be used.

Among them, at least one type selected from the group consisting of alkylene glycol monoalkyl ethers, alkylene glycol dialkyl ethers and alkylene glycol monoalkyl ether acetates is preferably included. Specifically, tripropylene glycol monomethyl ether, dipropylene glycol monomethyl ether, propylene glycol monomethyl ether, ethylene glycol monobutyl ether, diethylene glycol monobutyl ether, triethylene glycol monobutyl ether, tetraethylene glycol dialkyl ether, ethylene glycol monobutyl ether acetate, and diethylene glycol diethyl ether are preferable, and at least one type selected from the group consisting of tetratethylene glycol dialkyl ether, ethylene glycol monobutyl ether acetate, and diethylene glycol diethyl ether is most preferable.
<Surface Modifier>

A surface modifier is preferably added to the ink of the aforementioned embodiment for the purpose of the improvement of the wet spreadability on the recording medium and the prevention of cissing. Examples of the surface modifier include silicone-based surface modifiers, fluorine-based surface modifiers, acrylic-based surface modifiers and acetylene glycol-based surface modifiers. From the viewpoints of the surface tension reduction ability, and, the compatibility with the polymerizable monomer (D), a silicone-based surface modifier is preferably used.

Examples of the silicone-based surface modifier include compounds having a dimethylsiloxane skeleton, and the modified products thereof. Among them, a polyether-modified siloxane surface modifier may be preferably used. Examples of the polyether include polyethylene oxide and polypropylene oxide. Only one of polyethylene oxide and polypropylene oxide may be contained within the molecule, or both may be contained therein. The polyether-modified siloxane surface modifier, polyether-modified siloxane (co-polymer), polyether-modified polydimethylsiloxane and the like are available as commercially available products.

Examples of the commercial products which is preferably used includes:

a polyether-modified siloxane such as BYK (registered trademark)-378, 348 and 349 manufactured by BYK Chemie;

a polyether-modified polydimethylsiloxane such as BYK-UV3500 and UV3510; and a polyether-modified siloxane copolymer such as TEGO (registered trademark) GLIDE 450, 440, 435, 432, 410, 406, 130, 110, 100 manufactured by Evonik Degussa GmbH may be preferably used.

Among these, from the viewpoint of good image quality formation, polyether-modified siloxane surface modifiers such as BYK-378, 348 and UV3510; TEGO GLIDE 450, 440, 432 and 410 are preferably used.

The content of the silicone-based surface modifier is preferably from 0.1 to 5.0% by mass relative to the total mass of the ink. When the content of the silicone-based surface modifier is 0.1% by mass or more, the wet spreadability of the ink on the recording medium can be easily improved. On the other hand, when the content is 5.0% by mass or less, it becomes easy to maintain the storage stability and the discharge stability of the ink.
<Ink Production Method>

The production of the ink of the aforementioned embodiment may be realized by a conventionally well-known method, however, it may be specifically realized as follows. First, the C.I. pigment blue 15:6, the quinacridone-based pigment, the pigment dispersing resin (C), colorant derivative (B), the polymerizable compound (D), and, if necessary a surface modifier, a polymerization inhibitor, and a solvent were mixed together. Then, a paint shaker, a sand mill, a roll mill, or a media-less dispersion device or the like was used to disperse the pigment and prepare a pigment dispersion.

The aforementioned colorant derivative (B) may be added at the same time as the aforementioned pigment dispersing resin (C). As another method, prior to mixing with the aforementioned pigment dispersing resin (C), the aforementioned colorant derivative (B) may be mixed together or processed with the aforementioned C.I. pigment blue 15:6 and/or the aforementioned quinacridone-based pigment beforehand. In one embodiment, from the viewpoint of maintaining the long-term dispersion stability, preventing separation of the colorant derivative (B) within the ink, and suppressing the damage to the epoxy adhesive, the aforementioned colorant derivative (B) is preferably mixed together or processed with the aforementioned C.I. pigment blue 15:6 and/or the aforementioned quinacridone-based pigment beforehand.

Next, with respect to the obtained pigment dispersion, in order to have the desired ink properties, the remainder of the polymerizable compound (D) is added with the photopolymerization initiator (E), and if necessary other additives (for example, a surface modifier, a polymerization inhibitor, a solvent, and the like), and mixed well. Then, the obtained mixture was filtered through a filter and the like and the course particles were filtered out to obtain an ink.
<2>Ink Set As stated above, the color in the blue region may be satisfactorily reproduced by using the active energy ray curable inkjet ink of the aforementioned embodiment. Further, by using the active energy ray curable ink set (hereinafter, referred to simply as the "ink set") comprising the aforementioned active energy ray curable inkjet ink, the active energy ray curable inkjet yellow ink (hereinafter, referred to simply as the "yellow ink") and the active energy ray curable inkjet magenta ink (hereinafter, referred to simply as the "magenta ink") illustrated below, a printed matter having an excellent color clarity and color development, and a satisfactory color reproducibility across the green, blue, and red regions can be obtained.

<Active Energy Ray Curable Inkjet Yellow Ink>

The active energy ray curable inkjet ink of the aforementioned embodiment is used in combination with a yellow ink to obtain a printed matter having excellent color reproducibility in the green region. In one embodiment, the yellow pigment containing the yellow ink constituting the ink set preferably contains the yellow pigment having the partial structure represented by general formula (6), and/or, yellow pigment having a partial structure represented by the following general formula (7). These pigments may be used alone or two or more may be used in combination. When using two or more types of pigments together, pigments in a mixed crystal state may be used.

General formula (6):

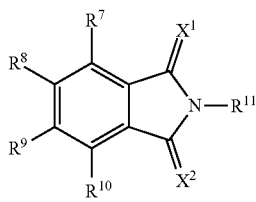

[Formula 6]

However, general formula (6) has at least one bond.

Further, in general formula (6), both $X^1$ and $X^2$=O, or =$CR^{12}R^{13}$, or $X^1$=O and $X^2$=$NR^{14}$ Further, $R^7$ to $R^{10}$ independently represent hydrogen atom or halogen atom, $R^{11}$ represents hydrogen atom or a bond, $R^{12}$ to $R^{14}$ respectively represent bonds.

General formula (7):

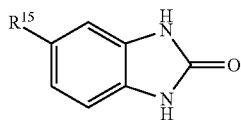

[Formula 7]

In general formula (7), $R^{15}$ represents a bond.

Phthalimide (in general formula (6), both $X^1$ and $X^2$=O, and C.I. pigment yellow 138 is provided as a specific example), isoindolinone (in general formula (6), $X^1$=O and $X^2$=$NR^{14}$, and C.I. pigment yellow 109 and 110 are provided as specific examples), isoindoline (in general formula (6), both $X^1$ and $X^2$=$CR^{12}R^{13}$, and C.I. pigment yellow 139 and 185 are provided as specific examples) and the like may be used as the partial structure represented by the aforementioned general formula (6).

Among the pigments listed above, one or more types selected from the group consisting of C.I. pigment yellow 139, and, 185 which are known as isoindoline-based yellow pigments is particularly preferably selected. When this kind of pigment was used, a printed matter having excellent color reproducibility in the green region and having an excellent tinting strength, and furthermore having an excellent image density can be easily obtained in combination with the active energy ray curable inkjet ink of the aforementioned embodiment.

On the other hand, benzimidazolone may be used as the partial structure represented by the aforementioned general formula (7), and as a specific example, C.I. pigment yellow 120, 151, 154, 175, 180, 181, 194 and the like may be provided.

Among the pigments listed above, one or more types selected from the group consisting of C.I. pigment yellow 175, 180, and, 194 is particularly preferably selected. When this kind of pigment was used, a printed matter having excellent color reproducibility in the green region and having an excellent tinting strength, and furthermore having an excellent image density can be easily obtained in combination with the active energy ray curable inkjet ink of the aforementioned embodiment.

In one embodiment, from the viewpoint of attaining both color reproducibility and dispersion stability, the specific surface area of the aforementioned yellow pigment having the partial structure represented by general formula (6), and/or, the yellow pigment having the partial structure represented by the aforementioned general formula (7) is preferably from 20 to 100 $m^2/g$, and more preferably from 30 to 70 $m^2/g$. The aforementioned specific surface area may be measured by the same method as the aforementioned C.I. pigment blue 15:6.

The total amount of the blending amounts of the aforementioned yellow pigment having the partial structure represented by general formula (6), and, the yellow pigment having the partial structure represented by the aforementioned general formula (7) may be from 1 to 10% by mass based on the total mass of the yellow ink. From the viewpoint of the dispersion stability and the discharge stability when storing the yellow ink long-term, the aforementioned blending amount is more preferably from 1.5 to 9 parts by mass, and particularly preferably from 2 to 8% by mass.

In addition to the aforementioned yellow pigments, the yellow ink constituting the ink set of the aforementioned embodiment may contain a colorant derivative, a pigment dispersing resin, a polymerizable compound, a photopolymerization initiator, and, other components (polymerization inhibitors, solvents, surface modifiers and the like). The details relating to these structural components are the same as the case of the aforementioned active energy ray curable inkjet ink.

<Active Energy Ray Curable Inkjet Magenta Ink>

The active energy ray curable inkjet ink of the aforementioned embodiment is used in combination with a magenta ink to obtain a printed matter having an excellent color reproducibility in the red region. In one embodiment, the magenta pigment contained in the magenta ink constituting the ink set preferably contains the magenta pigment having the partial structure represented by the following general formula (8). These pigments may be used alone or two or more may be used in combination. When using two or more types of pigments together, pigments in a mixed crystal state may be used.

General formula (8):

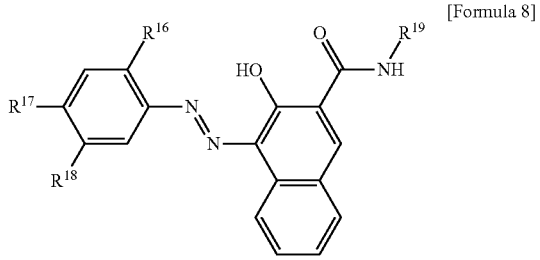

In general formula (8), $R^{16}$, $R^{17}$, and $R^{18}$ independently represent any of hydrogen atom, an alkyl group of 1 or 2 carbon atoms, an alkoxy group of 1 or 2 carbon atoms, an anilide group, an anilide group, a carbamoyl group, a methoxycarbonyl group, an ethoxycarbonyl group, or a sulfonamide group.

Further, $R^{19}$ represents hydrogen atom, an alkyl group of 1 or 2 carbon atoms, or, a structure represented by the following general formula (9).

General formula (9):

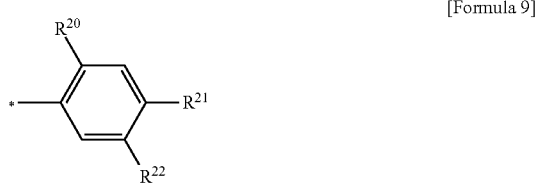

In general formula (9), $R^{20}$ represents hydrogen atom, chlorine atom, bromine atom, an alkyl group of 1 or 2 carbon atoms, an alkoxy group of 1 or 2 carbon atoms, an amino group, or, a nitro group.

$R^{21}$ and $R^{22}$ independently represent any of hydrogen atom, chlorine atom, bromine atom, an alkyl group of 1 or 2 carbon atoms, an alkoxy group of 1 or 2 carbon atoms, an amino group, a nitro group, or $R^{21}$ and $R^{22}$ may be bonded to each other to form an imidazolidinone ring.

Further, "*" represents a bond, and the partial structure represented by the aforementioned general formula (8) binds at this position.

Among the pigments listed above, at least one type selected from the group consisting of C.I. pigment red 146, 147, 150, 170, and, 184 is particularly preferably selected. When using these pigments, and, a printed matter having excellent color reproducibility in the red region and having an excellent tinting strength, and furthermore having an excellent image density can be easily obtained in a combination of the active energy ray curable inkjet ink of the aforementioned embodiment with the yellow ink of the aforementioned embodiment.

In one embodiment, from the viewpoint of attaining both color reproducibility and dispersion stability, the specific surface area of the magenta pigment having the partial structure represented by the aforementioned general formula (8) is preferably from 20 to 100 m²/g, and more preferably from 30 to 80 m²/g. The aforementioned specific surface area may be measured by the same method as the aforementioned C.I. pigment blue 15:6.

The total mass of the blending amount of the magenta pigment having the partial structure represented by the aforementioned general formula (8) may be from 1 to 10% by mass based on the total mass of the magenta ink. From the viewpoint of the dispersion stability and the discharge stability when storing the magenta ink long-term, the aforementioned blending amount is preferably from 1.5 to 9 parts by mass, and from 2 to 8% by mass is particularly preferable.

Other than the aforementioned magenta pigment, the magenta ink constituting the ink set of the aforementioned embodiment may contain a colorant derivative, a pigment dispersing resin, a polymerizable compound, a photopolymerization initiator and other components (polymerization inhibitors, solvents, surface modifiers and the like). The details relating to these structural components are the same as the case of the aforementioned active energy ray curable inkjet ink.

<Other Inks>

A green ink, a brown ink and the like may be further combined in the ink set of the aforementioned embodiment to increase the color reproducibility. Further, when used together with a black ink, it is possible to express a black color having a large contrast while suppressing the amount of ink used. Furthermore, when used together with a white ink, it is possible to form a printed matter having a good visibility on a transparent or colored recording medium. Further, light colored inks such as a light blue ink, a light magenta ink, a light yellow ink, and a light black ink may be used in combination.

A preferred embodiment is an ink set comprising the active energy ray curable inkjet ink of the aforementioned embodiment, the yellow ink comprising the aforementioned yellow pigment, and the magenta ink comprising the aforementioned magenta pigment. When this kind of ink set is used, specifically, a printed matter having excellent color reproducibility in regions across green, blue, and red may be easily obtained even without the use of other chromatic color (all colors having chroma) inks. Therefore, only an achromatic ink containing at least one type selected from the group consisting of black ink, light black ink, and white ink is preferably used as another ink in the ink set of the aforementioned embodiment.

<3>Printing Method and the Printed Matter

The active energy ray curable inkjet ink of the aforementioned embodiment, or, the active energy ray curable ink set of the aforementioned embodiment containing this active energy ray curable inkjet ink may be used to satisfactorily obtain the printed matter. Examples of the printing method for producing the printed matter include a process for discharging an active energy ray curable inkjet ink to a recording medium (printing process), and a process for irradiating an active energy ray on the aforementioned active energy ray curable inkjet ink provided on the aforementioned recording medium to cure the aforementioned active energy ray curable inkjet ink (curing process).

<Printing Process>

From the viewpoint of the productivity, the printing process in the aforementioned printing method preferably uses a single pass inkjet method. Further, the printing speed at this time is preferably 35 m/min or more, more preferably 50 m/min or more, and 75 m/min or more is particularly preferable.

<Curing Process>

The generation source of the active energy ray is not specifically limited, and a conventionally known generation source may be used. Specifically, a mercury lamp, a xenon lamp, a metal halide lamp, and a light emitting diode (LED) such as UV-LED, and a ultraviolet laser diode (UV-LD), and a gas solid state laser and the like may be provided. Among them, a UV-LED is preferably used.
<Recording Medium>

Examples of the recording medium used with the aforementioned printing method include a plastic substrate comprising materials such as polypropylene (PP), polyethylene (PE), polyethylene terephthalate (PET), nylon, polystyrene, and acrylate (PMMA and the like); a paper substrate such as an art coated paper, a semi-gloss coated paper and a cast coated paper; and a metal substrate such as aluminum vapor deposition paper.

The aforementioned recording medium may have a smooth surface or an uneven surface, and may have a transparent, a translucent, or an opaque surface. Further, two or more kinds of the recording medium may be bonded to each other. Furthermore, the recording medium may have a functional layer such as a release adhesive layer or the like may be provided on the opposite side of the printing surface.

EXAMPLES

The present invention will be further described below. However, the following examples do not limit the scope of patent right of the present invention. Unless stated otherwise, parts represents parts by mass, and % represents % by mass.

<1>Active Energy Ray Curable Inkjet Ink>

Example 1

First, the pigment dispersion was produced prior to producing the ink. 12 parts of C.I. pigment blue 15:6 (the specific surface area was 95 m$^2$/g and the bulk density was 0.1 kg/l) as pigment (A), 8 parts of C.I. pigment red 122 (quinacridone-based pigment), 10 parts of BYK-145 as the pigment dispersing resin (C), 1.25 parts of a compound represented by the aforementioned general formula (4) as the colorant derivative (B) and in which both $R^3$ and $R^4$ are hydrogen atom, and 68.75 parts of dipropylene glycol diacrylate (DPGDA) as the polymerizable compound (D) were charged into a tank, and stirred with a high-speed mixer until a uniform mixture was obtained. Next, the pigment dispersion was produced by dispersing these components in a horizontal sand mill for about 1 hour.

Next, the remainder of the polymerizable compound (D), the photopolymerization initiator (E), the additives, and the polymerization inhibitor were added sequentially at the formulation described in Example 1 of Table 1 to the obtained pigment dispersion while stirring, and mixed until the photopolymerization initiator dissolved. Subsequently, the previously obtained mixture was filtered using a depth type filter having a 1 μm pore size, and the coarse particles were removed to obtain an active energy ray curable inkjet ink 1.

The obtained active energy ray curable inkjet ink was evaluated by the following method.
<Color Reproducibility>

An inkjet discharge apparatus (OnePass JET manufactured by Tritek Co., Ltd.) fitted a head manufactured by KYOCERA Corporation (resolution: 600 dpi×600 dpi) was used to print the active energy ray curable inkjet ink 1 produced earlier on a substrate "PET50 (K2411)" manufactured by Lintec Corporation. The conditions during printing were set to a droplet volume of 14 μl and a print rate of 100%. Subsequently, a 240 W/cm metal halide lamp manufactured by GEW Ltd. was used to irradiate the aforementioned printed matter under the conditions of an integrated light quantity of 200 mJ/cm$^2$, and the aforementioned ink was cured to prepare a printed sample. The series of steps from printing to curing was performed at a printing speed of 50 m/min. The printed samples obtained thereby were measured by "X-Rite exact" manufactured by X-Rite, Inc., and the color reproducibility was evaluated. The measurement was performed under the conditions of a viewing angle of 2°, a D50 light source, and a CIE color system. The evaluation was judged on the scale of acceptable (OK) or not acceptable (NG) based on whether or not the following conditions were satisfied. A printed sample judged to be "OK" was deemed to be in the practicable region from the viewpoint of the color reproducibility evaluation. OK: Hue angle was from 270° to 330° in the L≤35 region NG: Hue angle was less than 270° or in excess of 330° in the L≤35 region <Initial Dispersion Stability>

Using a Nanotrac Wave II manufactured by Microtrac BEL Corp, the cumulative 50% average particle size (D50), and, the cumulative 99% average particle size (D99) of the active energy ray curable inkjet ink 1 produced as stated above were measured on a volume basis. At the time of measurement, the active energy ray curable inkjet ink 1 was appropriately diluted with DPGDA so that the concentration could be measured. The results of the measurement were graded on the following scale from 1 to 5, and grades of 3 or more were deemed to be in the practicable region.

(Evaluation Criteria)
   5: D99/D50 value was 4 or less, and, D50<150 nm
   4: D99/D50 value was 5 or less, and, D50<180 nm (however, excluding average particle sizes corresponding to the aforementioned grade 5)
   3: D99/D50 value was 5 or less, and, D50<200 nm (however, excluding average particle sizes corresponding to the aforementioned grade 4)
   2: the average particle size could be measured, however, the average particle size was outside the conditions of the aforementioned grade 3
   1: a uniform dispersion could not be obtained and the average particle size could not be measured <Long-term Dispersion Stability>

The active energy ray curable inkjet ink 1 produced as stated above was filled in a glass container so that the filling rate was 85% of the container capacity, and the container was stored in a closed in a shielded state for 10 days under an environment of 60° C. Then, using a Nanotrac Wave II manufactured by Microtrac BEL Corp, the cumulative 50% average particle size (D50), and, the cumulative 99% average particle size (D99) were measured on a volume basis. At the time of measurement, the active energy ray curable inkjet ink 1 was appropriately diluted with DPGDA so that the concentration could be measured. The results of the measurement were graded on the following scale from 1 to 5, and grades of 3 or more were deemed to be in the practicable region.

(Evaluation Criteria)
   5: D99/D50 value was 4 or less, and, D50<150 nm
   4: D99/D50 value was 5 or less, and, D50<180 nm (However, excluding average particle sizes corresponding to the aforementioned grade 5)
   3: D99/D50 value was 5 or less, and, D50<200 nm (However, excluding average particle sizes corresponding to the aforementioned grades 5 or 4)
   2: the average particle size could be measured, however the average particle size was outside the conditions of the aforementioned grade 3

1: the ink solidified or gelled, and thus, the average particle size could not be measured <Discharge Stability>

The active energy ray curable inkjet ink 1 prepared as stated above was filled in a DotView (fitted with a 30 kHz inkjet head manufactured by KYOCERA Corporation) manufactured by Tritek Co., Ltd., and the state of the discharge from the inkjet head was observed. The head temperature during discharge was set to 40° C., the liquid droplet velocity was changed by adjusting the head voltage, and the liquid droplet velocity was examined when satellite droplets were produced to evaluate the discharge stability. The evaluation results were graded on the following scale from 1 to 5, and grades of 3 or more were deemed to be in the practicable region. In general, the higher the liquid droplet velocity, the more satellite droplets tend to be produced. (Evaluation criteria)

5: satellite droplets were not produced at a liquid droplet velocity of 7.5 m/s
4: satellite droplets were produced at a liquid droplet velocity from 7.0 m/s to less than 7.5 m/s
3: satellite droplets were produced at liquid droplet velocity from 6.0 m/s to less than 7.0 m/s
2: satellite droplets were produced at liquid droplet velocity from 5.0 m/s to less than 6.0 m/s
1: satellite droplets were produced at a liquid droplet velocity less than 5.0 m/s <Corrosion to Epoxy Adhesive>

First, an adhesive A was produced by the method described in paragraph 0091 of JP 2002-210964 A, and approximately 2 g of the adhesive A was dropped onto a glass plate. Then, the aforementioned adhesive was dried for two hours on a glass plate in a 120° C. oven to prepare a cured product of the adhesive. The adhesive cured product adhered to the glass plate was immersed with the glass plates in the active energy ray curable inkjet ink 1 produced as stated above, and stored for 4 weeks under an environment of 60° C. Then, the aforementioned ink was wiped off, the change in shape and the change in mass before and after immersion were verified, and the corrosion of the active energy ray curable inkjet ink to the epoxy adhesive was evaluated. The evaluation results were graded on the following scale from 1 to 5, and grades of 3 or more were deemed to be in the practicable region. (Evaluation criteria)

5: no significant deformation to the outer appearance of the adhesive cured product, and the mass change rate was less than 1%
4: no significant deformation to the outer appearance of the adhesive cured product, and the mass change rate was from 1% to less than 2%
3: no significant deformation to the outer appearance of the adhesive cured product, and the mass change rate was from 2% to less than 4%
2: the outer appearance of the adhesive cured product was deformed, or, the mass change rate was from 4% to less than 6%
1: the outer appearance of the adhesive cured product was significantly deformed, or, the mass change rate was 6% or more Examples 2 to 45 and Comparative Examples 1 to 13

With the exception of changing the blending of Example 1 to the respective blendings described in Table 1 and Table 2, the inks were produced in the same method as the above-mentioned Example 1 to obtain active energy ray curable inkjet inks 2 to 58. Then, each evaluation was performed in accordance with the previously described methods.

TABLE 1

|  |  |  | Example 1 | Example 2 | Example 3 | Example 4 | Example 5 | Example 6 | Example 7 |
|---|---|---|---|---|---|---|---|---|---|
|  |  | Ink No. | 1 | 2 | 3 | 4 | 5 | 6 | 7 |
| Pigment (A) | C.I. pigment blue 15:6 | C.I. pigment blue 15:6-1 Specific surface area 95 m²/g, bulk density 0.1 kg/l C.I. pigment blue 15:6-2 Specific surface area 50 m²/g, bulk density 0.25 kg/l C.I. pigment blue 15:6-3 specific surface area 35 m²/g, bulk density 0.35 kg/l | 2.4 | 2.4 | 2.4 | 2.4 | 3 | 1 | 1.8 |
|  | Quinacridone-based pigment | C.I pigment red 122 C.I pigment red 202 C.I pigment red 209 C.I pigment red 282 C.I. pigment violet 19 | 1.6 | 1.6 | 1.6 | 1.6 | 1 | 3 | 1.2 |
| Dye derivative (B) | Pigment derivative having quinacridone skeleton | Compound represented by the general formula (4) in which both R3 and R4 are hydrogen atoms Compound represented by the general formula (4) in which both R3 and R4 are methyl groups Compound represented by the general formula (5) in which both R5 and R6 are hydrogen atoms | 0.25 | 0.25 | 0.25 | 0.25 | 0.25 | 0.25 | 0.19 |

TABLE 1-continued

| | | | | | | | | | |
|---|---|---|---|---|---|---|---|---|---|
| Pigment dispersion resin (C) | Comb pigment dispersion resin having polyamine or polyimine as main chain | BYK-145 acid value 76 mgKOH/g, amine value 71 mgKOH/g | 2 | 2 | 2 | 2 | 2 | 2 | |
| | | Solsperse J180 acid value 35 mgKOH/g, amine value 30 mgKOH/g | | | | | | | 1.5 |
| | Other | BYK-106 acid value 132 mgKOH/g, amine value 74 mgKOH/g | | | | | | | |
| | | Acrylic resin A acid value 41 mgKOH/g, amine value 26 mgKOH/g | | | | | | | |
| | | Acrylic resin B acid value 94 mgKOH/g, amine value 19 mgKOH/g | | | | | | | |
| Polymerizable compound (D) | Trifunctional or greater | TMPTA | | | | | | | |
| | | TMP(EO)TA | | | | | | | |
| | | GPTA | | | | | | | |
| | | PETA | | | | | | | |
| | | DPHA | | | | | | | |
| | Difunctional | DPGDA | 50 | 50 | 50 | 19.25 | 30 | 30 | 30 |
| | | HDDA | 29.25 | 14.25 | 9.25 | | 9.25 | 9.25 | 10.81 |
| | | PEGDA | | | | | | | |
| | | VEEA | | 15 | 20 | 60 | 40 | 40 | 40 |
| | Monofunctional | BzA | | | | | | | |
| | | IBXA | | | | | | | |
| | | THFA | | | | | | | |
| | | (EO)PEA | | | | | | | |
| | | PEA | | | | | | | |
| Photo polymerization initiator (E) | α-hydroxy acetophenone-based (E-1) | OMINIRAD 659 | | | | | | 4 | 6 |
| | | ESACURE ONE | 4 | 4 | 4 | 4 | 4 | | 6 |
| | Acylphosphine oxide-based | OMINIRAD 819 OMNIRAD TPO | 4 | 4 | 4 | 4 | 4 | 4 | |
| | Benzophenone-based | OMINIRAD BMS | 4 | 4 | 4 | 4 | 4 | 4 | |
| | Other | OMNIRAD EDB | | | | | | | |
| Polymerization inhibitor | Hindered phenol-based | 2,6-di-t-butyl-4-methylphenol | 0.5 | 0.5 | 0.5 | 0.5 | 0.5 | 0.5 | 0.5 |
| | Phenothiazine-based | Phenothiazine | | | | | | | |
| Surface modifier | Polyether-modified siloxane-based | TEGO GLIDE 450 BYK UV 3510 | 2 | 2 | 2 | 2 | 2 | 2 | 2 |
| | Total | | 100 | 100 | 100 | 100 | 100 | 100 | 100 |
| Evaluation item | Color reproducibility | | OK | OK | OK | OK | OK | OK | OK |
| | Initial dispersion stability | | 5 | 5 | 5 | 5 | 5 | 5 | 5 |
| | Long-term dispersion stability | | 4 | 4 | 5 | 5 | 5 | 5 | 5 |
| | Discharge stability | | 4 | 4 | 4 | 4 | 4 | 4 | 5 |
| | Corrosion to epoxy adhesive | | 3 | 3 | 4 | 5 | 4 | 4 | 4 |

| | | | Example 8 | Example 9 | Example 10 | Example 11 | Example 12 | Example 13 | Example 14 |
|---|---|---|---|---|---|---|---|---|---|
| | | Ink No. | 8 | 9 | 10 | 11 | 12 | 13 | 14 |
| Pigment (A) | C.I. pigment blue 15:6 | C.I. pigment blue 15:6-1 Specific surface area 95 m²/g, bulk density 0.1 kg/l | 3.6 | 2.4 | 2.4 | 2.4 | 2.4 | 2.4 | |
| | | C.I. pigment blue 15:6-2 Specific surface area 50 m²/g, bulk density 0.25 kg/l | | | | | | | 2.4 |
| | | C.I. pigment blue 15:6-3 specific surface area 35 m²/g, bulk density 0.35 kg/l | | | | | | | |
| | Quinacridone-based pigment | C.I pigment red 122 | 2.4 | 1.6 | 1.6 | 1.6 | 1.6 | 1.6 | 1.6 |
| | | C.I pigment red 202 | | | | | | | |
| | | C.I pigment red 209 | | | | | | | |
| | | C.I pigment red 282 | | | | | | | |
| | | C.I pigment violet 19 | | | | | | | |
| Dye derivative (B) | Pigment derivative having quinacridone skeleton | Compound represented by the general formula (4) in which both R3 and R4 are hydrogen atoms | 0.38 | 0.04 | 0.08 | 0.4 | 0.8 | 0.25 | 0.25 |
| | | Compound represented by the general formula (4) | | | | | | | |

TABLE 1-continued

| Category | Sub | Component | Ex. 8 | Ex. 9 | Ex. 10 | Ex. 11 | Ex. 12 | Ex. 13 | Ex. 14 |
|---|---|---|---|---|---|---|---|---|---|
| | | in which both R3 and R4 are methyl groups | | | | | | | |
| | | Compound represented by the general formula (5) in which both R5 and R6 are hydrogen atoms | | | | | | | |
| Pigment dispersion resin (C) | Comb pigment dispersion resin having polyamine or polyimine as main chain | BYK-145 acid value 76 mgKOH/g, amine value 71 mgKOH/g | | 2 | 2 | 2 | 2 | 2 | 2 |
| | | Solsperse J180 acid value 35 mgKOH/g, amine value 30 mgKOH/g | 3 | | | | | | |
| | Other | BYK-106 acid value 132 mgKOH/g, amine value 74 mgKOH/g | | | | | | | |
| | | Acrylic resin A acid value 41 mgKOH/g, amine value 26 mgKOH/g | | | | | | | |
| | | Acrylic resin B acid value 94 mgKOH/g, amine value 19 mgKOH/g | | | | | | | |
| Polymerizable compound (D) | Trifunctional or greater | TMPTA | | | | | | | |
| | | TMP(EO)TA | | | | | | | |
| | | GPTA | | | | | | | |
| | | PETA | | | | | | | |
| | | DPHA | | | | | | | |
| | Difunctional | DPGDA | 20.12 | 39.46 | 39.42 | 39.1 | 38.7 | 50 | 50 |
| | | HDDA | | | | | | 29.25 | 29.25 |
| | | PEGDA | | | | | | | |
| | | VEEA | 60 | 40 | 40 | 40 | 40 | | |
| | Monofunctional | BzA | | | | | | | |
| | | IBXA | | | | | | | |
| | | THFA | | | | | | | |
| | | (EO)PEA | | | | | | | |
| | | PEA | | | | | | | |
| Photo polymerization initiator (E) | α-hydroxy acetophenone-based (E-1) | OMNIRAD 659 | | | | 4 | | | |
| | | ESACURE ONE | 4 | 4 | 4 | | 4 | 6 | 4 |
| | Acylphosphine oxide-based | OMNIRAD 819 | 4 | 4 | 4 | 4 | 4 | | 4 |
| | | OMNIRAD TPO | | | | | | 4 | |
| | Benzophenone-based | OMNIRAD BMS | | 4 | 4 | 4 | 2 | 4 | 4 |
| | Other | OMNIRAD EDB | | | | | | 4 | |
| Polymerization inhibitor | Hindered phenol-based | 2,6-di-t-butyl-4-methylphenol | 0.5 | 0.5 | 0.5 | 0.5 | 0.5 | 0.5 | 0.5 |
| | Phenothiazine-based | Phenothiazine | | | | | | | |
| Surface modifier | Polyether-modified siloxane-based | TEGO GLIDE 450 | 2 | 2 | 2 | 2 | 2 | 2 | 2 |
| | | BYK UV 3510 | | | | | | | |
| Evaluation item | | Total | 100 | 100 | 100 | 100 | 100 | 100 | 100 |
| | | Color reproducibility | OK | OK | OK | OK | OK | OK | OK |
| | | Initial dispersion stability | 5 | 3 | 3 | 5 | 5 | 5 | 5 |
| | | Long-term dispersion stability | 5 | 4 | 4 | 4 | 3 | 3 | 4 |
| | | Discharge stability | 4 | 3 | 4 | 5 | 4 | 3 | 4 |
| | | Corrosion to epoxy adhesive | 5 | 3 | 3 | 5 | 5 | 3 | 3 |

| | | | Example 15 | Example 16 | Example 17 | Example 18 | Example 19 | Example 20 | Example 21 | Example 22 |
|---|---|---|---|---|---|---|---|---|---|---|
| | | Ink No. | 15 | 16 | 17 | 18 | 19 | 20 | 21 | 22 |
| Pigment (A) | C.I. pigment blue 15:6 | C.I. pigment blue 15:6-1 Specific surface area 95 m²/g, bulk density 0.1 kg/l | | 2.4 | 2.4 | 2.4 | 2.4 | 2.4 | 2.4 | 2.4 |
| | | C.I. pigment blue 15:6-2 Specific surface area 50 m²/g, bulk density 0.25 kg/l | | | | | | | | |
| | | C.I. pigment blue 15:6-3 specific surface area 35 m²/g, bulk density 0.35 kg/l | 2.4 | | | | | | | |
| | Quinacridone-based pigment | C.I pigment red 122 | 1.6 | | | | | 1.6 | 1.6 | 1.6 |
| | | C.I pigment red 202 | | 1.6 | | | | | | |
| | | C.I pigment red 209 | | | 1.6 | | | | | |
| | | C.I pigment red 282 | | | | 1.6 | | | | |
| | | C.I. pigment violet 19 | | | | | 1.6 | | | |

TABLE 1-continued

| | | | | | | | | | | | |
|---|---|---|---|---|---|---|---|---|---|---|---|
| Dye derivative (B) | Pigment derivative having quinacridone skeleton | Compound represented by the general formula (4) in which both R3 and R4 are hydrogen atoms | 0.25 | 0.25 | 0.25 | 0.25 | 0.25 | | | 0.25 |
| | | Compound represented by the general formula (4) in which both R3 and R4 are methyl groups | | | | | | | 0.25 | |
| | | Compound represented by the general formula (5) in which both R5 and R6 are hydrogen atoms | | | | | | | | 0.25 | |
| Pigment dispersion resin (C) | Comb pigment dispersion resin having polyamine or polyimine as main chain | BYK-145 acid value 76 mgKOH/g, amine value 71 mgKOH/g | 2 | 2 | 2 | 2 | 2 | 2 | | |
| | | Solsperse J180 acid value 35 mgKOH/g, amine value 30 mgKOH/g | | | | | | | 2 | |
| | Other | BYK-106 acid value 132 mgKOH/g, amine value 74 mgKOH/g | | | | | | | | 2 |
| | | Acrylic resin A acid value 41 mgKOH/g, amine value 26 mgKOH/g | | | | | | | | |
| | | Acrylic resin B acid value 94 mgKOH/g, amine value 19 mgKOH/g | | | | | | | | |
| Polymeriable comound (D) | Trifunctional or greater | TMPTA | | | | | | | | |
| | | TMP(EO)TA | | | | | | | | |
| | | GPTA | | | | | | | | |
| | | PETA | | | | | | | | |
| | | DPHA | | | | | | | | |
| | Difunctional | DPGDA | 50 | 50 | 30 | 30 | 30 | 50 | 50 | 30 |
| | | HDDA | 29.25 | 29.25 | 9.25 | 9.25 | 9.25 | 29.25 | 29.25 | 9.25 |
| | | PEGDA | | | | | | | | |
| | | VEEA | | | 40 | 40 | 40 | | | 40 |
| | Monofunctional | BzA | | | | | | | | |
| | | IBXA | | | | | | | | |
| | | THFA | | | | | | | | |
| | | (EO)PEA | | | | | | | | |
| | | PEA | | | | | | | | |
| Photo polymerization initiator (E) | α-hydroxy acetophenone-based (E-1) | OMNIRAD 659 | | | | | | | | 2 |
| | | ESACURE ONE | 4 | | | | | 4 | 4 | 4 |
| | Acylphosphine oxide-based | OMNIRAD 819 | 4 | | | | | 4 | 4 | 4 |
| | | OMNIRAD TPO | | 4 | 4 | 4 | 4 | | | |
| | Benzophenone-based | OMNIRAD BMS | 4 | 4 | 4 | 4 | 4 | 4 | 4 | 2 |
| | Other | OMNIRAD EDB | | 4 | 4 | 4 | 4 | | | |
| Polymerization inhibitor | Hindered phenol-based | 2,6-di-t-butyl-4-methylphenol | 0.5 | 0.5 | 0.5 | 0.5 | 0.5 | 0.5 | 0.5 | 0.5 |
| | Phenothiazine-based | Phenothiazine | | | | | | | | |
| Surface modifier | Polyether-modified siloxane-based | TEGO GLIDE 450 | 2 | 2 | 2 | 2 | 2 | 2 | 2 | 2 |
| | | BYK UV 3510 | | | | | | | | |
| Evaluation item | | Total | 100 | 100 | 100 | 100 | 100 | 100 | 100 | 100 |
| | | Color reproducibility | OK | OK | OK | OK | OK | OK | OK | OK |
| | | Initial dispersion stability | 4 | 5 | 5 | 4 | 5 | 3 | 4 | 4 |
| | | Long-term dispersion stability | 3 | 3 | 4 | 4 | 5 | 3 | 4 | 5 |
| | | Discharge stability | 4 | 3 | 3 | 3 | 4 | 4 | 4 | 5 |
| | | Corrosion to epoxy adhesive | 3 | 3 | 4 | 4 | 4 | 3 | 4 | 4 |

| | | | Example 23 | Example 24 | Example 25 | Example 26 | Example 27 | Example 28 | Example 29 |
|---|---|---|---|---|---|---|---|---|---|
| | | Ink No. | 23 | 24 | 25 | 26 | 27 | 28 | 29 |
| Pigment (A) | C.I. pigment blue 15:6 | C.I. pigment blue 15:6-1 Specific surface area 95 m$^2$/g, bulk density 0.1 kg/l | 2.4 | 2.4 | 2.4 | 2.4 | 2.4 | 2.4 | 2.4 |
| | | C.I. pigment blue 15:6-2 Specific surface area 50 m$^2$/g, bulk density 0.25 kg/l | | | | | | | |

TABLE 1-continued

| | | | | | | | | | |
|---|---|---|---|---|---|---|---|---|---|
| | | C.I. pigment blue 15:6-3 specific surface area 35 m²/g, bulk density 0.35 kg/l | | | | | | | |
| | Quinacridone-based pigment | C.I pigment red 122 | 1.6 | 1.6 | 1.6 | 1.6 | 1.6 | 1.6 | 1.6 |
| | | C.I pigment red 202 | | | | | | | |
| | | C.I pigment red 209 | | | | | | | |
| | | C.I pigment red 282 | | | | | | | |
| | | C.I. pigment violet 19 | | | | | | | |
| Dye derivative (B) | Pigment derivative having quinacridone skeleton | Compound represented by the general formula (4) in which both R3 and R4 are hydrogen atoms | 0.25 | 0.25 | 0.25 | 0.25 | 0.25 | 0.25 | 0.25 |
| | | Compound represented by the general formula (4) in which both R3 and R4 are methyl groups | | | | | | | |
| | | Compound represented by the general formula (5) in which both R5 and R6 are hydrogen atoms | | | | | | | |
| Pigment dispersion resin (C) | Comb pigment dispersion resin having polyamine or polyimine as main chain | BYK-145 acid value 76 mgKOH/g, amine value 71 mgKOH/g | | | | | | | |
| | | Solsperse J180 acid value 35 mgKOH/g, amine value 30 mgKOH/g | 2 | 2 | 2 | 0.8 | 1.2 | 3.2 | 4 |
| | Other | BYK-106 acid value 132 mgKOH/g, amine value 74 mgKOH/g | | | | | | | |
| | | Acrylic resin A acid value 41 mgKOH/g, amine value 26 mgKOH/g | | | | | | | |
| | | Acrylic resin B acid value 94 mgKOH/g, amine value 19 mgKOH/g | | | | | | | |
| Polymeriable comound (D) | Trifunctional or greater | TMPTA | | | | | | | |
| | | TMP(EO)TA | | | | | | | |
| | | GPTA | | | | | | | |
| | | PETA | | | | | | | |
| | | DPHA | | | | | | | |
| | Difunctional | DPGDA | 30 | 10 | 50 | 20 | 20 | 20 | 20 |
| | | HDDA | 9.25 | 9.25 | 29.25 | 30.45 | 30.05 | 28.05 | 27.25 |
| | | PEGDA | | | | | | | |
| | | VEEA | 40 | 60 | | 30 | 30 | 30 | 30 |
| | Monofunctional | BzA | | | | | | | |
| | | IBXA | | | | | | | |
| | | THFA | | | | | | | |
| | | (EO)PEA | | | | | | | |
| | | PEA | | | | | | | |
| Photo polymerization initiator (E) | α-hydroxy acetophenone-based (E-1) | OMINIRAD 659 | 2 | 2 | 2 | 4 | 4 | 4 | 4 |
| | | ESACURE ONE | 4 | 4 | 4 | 4 | 4 | 4 | 4 |
| | Acylphosphine oxide-based | OMINIRAD 819 | 4 | 4 | 4 | | | | |
| | | OMNIRAD TPO | | | | | | | |
| | Benzophenone-based | OMINIRAD BMS | 2 | 2 | 2 | 4 | 4 | 4 | 4 |
| | Other | OMNIRAD EDB | | | | | | | |
| Polymerization inhibitor | Hindered phenol-based | 2,6-di-t-butyl-4-methylphenol | 0.5 | 0.5 | 0.5 | 0.5 | 0.5 | 0.5 | 0.5 |
| | Phenothiazine-based | Phenothiazine | | | | | | | |
| Surface modifier | Polyether-modified siloxane-based | TEGO GLIDE 450 | 2 | 2 | 2 | 2 | 2 | 2 | 2 |
| | | BYK UV 3510 | | | | | | | |
| | | Total | 100 | 100 | 100 | 100 | 100 | 100 | 100 |
| Evaluation item | | Color reproducibility | OK | OK | OK | OK | OK | OK | OK |
| | | Initial dispersion stability | 5 | 5 | 5 | 3 | 5 | 5 | 5 |
| | | Long-term dispersion stability | 5 | 5 | 4 | 3 | 5 | 5 | 4 |
| | | Discharge stability | 5 | 5 | 5 | 3 | 5 | 5 | 3 |
| | | Corrosion to epoxy adhesive | 5 | 5 | 4 | 5 | 5 | 4 | 3 |

TABLE 1-continued

| | | | Example 30 | Example 31 | Example 32 | Example 33 | Example 34 | Example 35 | Example 36 | Example 37 |
|---|---|---|---|---|---|---|---|---|---|---|
| | | Ink No. | 30 | 31 | 32 | 33 | 34 | 35 | 36 | 37 |
| Pigment (A) | C.I. pigment blue 15:6 | C.I. pigment blue 15:6-1 Specific surface area 95 m$^2$/g, bulk density 0.1 kg/l | 2.4 | 2.4 | 2.4 | 2.4 | 2.4 | 2.4 | 2.4 | 2.4 |
| | | C.I. pigment blue 15:6-2 Specific surface area 50 m$^2$/g, bulk density 0.25 kg/l | | | | | | | | |
| | | C.I. pigment blue 15:6-3 specific surface area 35 m$^2$/g, bulk density 0.35 kg/l | | | | | | | | |
| | Quinacridone-based pigment | C.I pigment red 122 | 1.6 | 1.6 | 1.6 | 1.6 | 1.6 | 1.6 | 1.6 | 1.6 |
| | | C.I pigment red 202 | | | | | | | | |
| | | C.I pigment red 209 | | | | | | | | |
| | | C.I pigment red 282 | | | | | | | | |
| | | C.I. pigment violet 19 | | | | | | | | |
| Dye derivative (B) | Pigment derivative having quinacridone skeleton | Compound represented by the general formula (4) in which both R3 and R4 are hydrogen atoms | 0.25 | 0.25 | 0.25 | 0.25 | 0.25 | 0.25 | 0.25 | 0.25 |
| | | Compound represented by the general formula (4) in which both R3 and R4 are methyl groups | | | | | | | | |
| | | Compound represented by the general formula (5) in which both R5 and R6 are hydrogen atoms | | | | | | | | |
| Pigment dispersion resin (C) | Comb pigment dispersion resin having polyamine or polyimine as main chain | BYK-145 acid value 76 mgKOH/g, amine value 71 mgKOH/g | | | | | | | | |
| | | Solsperse J180 acid value 35 mgKOH/g, amine value 30 mgKOH/g | 2 | | | | 2 | 2 | 2 | 2 |
| | Other | BYK-106 acid value 132 mgKOH/g, amine value 74 mgKOH/g | | 2 | | | | | | |
| | | Acrylic resin A acid value 41 mgKOH/g, amine value 26 mgKOH/g | | | 2 | | | | | |
| | | Acrylic resin B acid value 94 mgKOH/g, amine value 19 mgKOH/g | | | | 2 | | | | |
| Polymerizable compound (D) | Trifunctional or greater | TMPTA | | | | | 14.25 | | | |
| | | TMP(EO)TA | | | | | | 14.25 | | |
| | | GPTA | | | | | | | 14.25 | |
| | | PETA | | | | | | | | 14.25 |
| | | DPHA | | | | | | | | |
| | Difunctional | DPGDA | 50 | 50 | 50 | 50 | 50 | 50 | 50 | 50 |
| | | HDDA | 29.25 | 29.25 | 29.25 | 29.25 | 15 | 15 | 15 | 15 |
| | | PEGDA | | | | | | | | |
| | | VEEA | | | | | | | | |
| | Monofunctional | BzA | | | | | | | | |
| | | IBXA | | | | | | | | |
| | | THFA | | | | | | | | |
| | | (EO)PEA | | | | | | | | |
| | | PEA | | | | | | | | |
| Photo polymerization initiator (E) | α-hydroxy acetophenone-based (E-1) | OMNIRAD 659 | | | | | | | | |
| | | ESACURE ONE | 4 | 4 | 4 | 4 | 4 | 4 | 4 | 4 |
| | Acylphosphine oxide-based | OMNIRAD 819 | 4 | 4 | 4 | 4 | 4 | 4 | 4 | 4 |
| | | OMNIRAD TPO | | | | | | | | |
| | Benzophenone-based | OMNIRAD BMS | 4 | 4 | 4 | 4 | 4 | 4 | 4 | 4 |
| | Other | OMNIRAD EDB | | | | | | | | |

TABLE 1-continued

| | | | | | | | | | | |
|---|---|---|---|---|---|---|---|---|---|---|
| Polymerization inhibitor | Hindered phenol-based | 2,6-di-t-butyl-4-methylphenol | 0.5 | 0.5 | 0.5 | 0.5 | 0.5 | 0.5 | 0.5 | 0.5 |
| | Phenothiazine-based | Phenothiazine | | | | | | | | |
| Surface modifier | Polyether-modified siloxane-based | TEGO GLIDE 450 BYK UV 3510 | 2 | 2 | 2 | 2 | 2 | 2 | 2 | 2 |
| | | Total | 100 | 100 | 100 | 100 | 100 | 100 | 100 | 100 |
| Evaluation item | | Color reproducibility | OK | OK | OK | OK | OK | OK | OK | OK |
| | | Initial dispersion stability | 4 | 3 | 3 | 3 | 4 | 3 | 4 | 3 |
| | | Long-term dispersion stability | 4 | 4 | 4 | 3 | 3 | 4 | 3 | 4 |
| | | Discharge stability | 4 | 4 | 4 | 3 | 3 | 3 | 3 | 3 |
| | | Corrosion to epoxy adhesive | 4 | 3 | 4 | 3 | 4 | 4 | 4 | 4 |

| | | | Example 38 | Example 39 | Example 40 | Example 41 | Example 42 | Example 43 | Example 44 | Example 45 |
|---|---|---|---|---|---|---|---|---|---|---|
| | | Ink No. | 38 | 39 | 40 | 41 | 42 | 43 | 44 | 45 |
| Pigment (A) | C.I. pigment blue 15:6 | C.I. pigment blue 15:6-1 Specific surface area 95 m²/g, bulk density 0.1 kg/l | 2.4 | 2.4 | 2.4 | 2.4 | 2.4 | 2.4 | 2.4 | 2.4 |
| | | C.I. pigment blue 15:6-2 Specific surface area 50 m²/g, bulk density 0.25 kg/l | | | | | | | | |
| | | C.I. pigment blue 15:6-3 specific surface area 35 m²/g, bulk density 0.35 kg/l | | | | | | | | |
| | Quinacridone-based pigment | C.I pigment red 122 | 1.6 | 1.6 | 1.6 | 1.6 | 1.6 | 1.6 | 1.6 | 1.6 |
| | | C.I pigment red 202 | | | | | | | | |
| | | C.I pigment red 209 | | | | | | | | |
| | | C.I pigment red 282 | | | | | | | | |
| | | C.I. pigment violet 19 | | | | | | | | |
| Dye derivative (B) | Pigment derivative having quinacridone skeleton | Compound represented by the general formula (4) in which both R3 and R4 are hydrogen atoms | 0.25 | 0.25 | 0.25 | 0.25 | 0.25 | 0.25 | 0.25 | 0.25 |
| | | Compound represented by the general formula (4) in which both R3 and R4 are methyl groups | | | | | | | | |
| | | Compound represented by the general formula (5) in which both R5 and R6 are hydrogen atoms | | | | | | | | |
| Pigment dispersion resin (C) | Comb pigment dispersion resin having polyamine or polyimine as main chain | BYK-145 acid value 76 mgKOH/g, amine value 71 mgKOH/g | | | | | | | | |
| | | Solsperse J180 acid value 35 mgKOH/g, amine value 30 mgKOH/g | 2 | 2 | 2 | 2 | 2 | 2 | 2 | 2 |
| | Other | BYK-106 acid value 132 mgKOH/g, amine value 74 mgKOH/g | | | | | | | | |
| | | Acrylic resin A acid value 41 mgKOH/g, amine value 26 mgKOH/g | | | | | | | | |
| | | Acrylic resin B acid value 94 mgKOH/g, amine value 19 mgKOH/g | | | | | | | | |
| Polymeriable comound (D) | Trifunctional or greater | TMPTA | | | | | | | | |
| | | TMP(EO)TA | | 14.25 | | | | | | 14.25 |
| | | GPTA | | | | | | | | |
| | | PETA | | | | | | | | |
| | | DPHA | 14.25 | | | | | | | |
| | Difunctional | DPGDA | 50 | 25 | 40 | 50 | 50 | 50 | 50 | 25 |
| | | HDDA | 15 | 25 | 25 | | | | | |
| | | PEGDA | | | | 15 | 15 | 15 | 15 | |
| | | VEEA | | | | | | | | 25 |
| | Monofunctional | BzA | | | | | 14.25 | | | |
| | | IBXA | | | | | | 14.25 | | |
| | | THFA | | | | | | | 14.25 | |
| | | (EO)PEA | | 15 | 14.25 | 14.25 | | | | 15 |
| | | PEA | | | | | | | | |

TABLE 1-continued

| | | | | | | | | | | |
|---|---|---|---|---|---|---|---|---|---|---|
| Photo polymerization initiator (E) | α-hydroxy acetophenone-based (E-1) | OMNIRAD 659 ESACURE ONE | 4 | 4 | 4 | 4 | 4 | 4 | 4 | 4 |
| | Acylphosphine oxide-based | OMNIRAD 819 OMNIRAD TPO | 4 | 4 | 4 | 4 | 4 | 4 | 4 | 4 |
| | Benzophenone-based | OMNIRAD BMS | 4 | 4 | 4 | 4 | 4 | 4 | 4 | 4 |
| | Other | OMNIRAD EDB | | | | | | | | |
| Polymerization inhibitor | Hindered phenol-based | 2,6-di-t-butyl-4-methylphenol | 0.5 | 0.5 | 0.5 | 0.5 | 0.5 | 0.5 | 0.5 | 0.5 |
| | Phenothiazine-based | Phenothiazine | | | | | | | | |
| Surface modifier | Polyether-modified siloxane-based | TEGO GLIDE 450 BYK UV 3510 | 2 | 2 | 2 | 2 | 2 | 2 | 2 | 2 |
| | Total | | 100 | 100 | 100 | 100 | 100 | 100 | 100 | 100 |
| Evaluation item | Color reproducibility | | OK | OK | OK | OK | OK | OK | OK | OK |
| | Initial dispersion stability | | 4 | 4 | 4 | 4 | 4 | 4 | 4 | 4 |
| | Long-term dispersion stability | | 3 | 3 | 4 | 4 | 4 | 3 | 4 | 3 |
| | Discharge stability | | 3 | 3 | 3 | 3 | 3 | 3 | 3 | 4 |
| | Corrosion to epoxy adhesive | | 4 | 3 | 3 | 3 | 3 | 3 | 3 | 3 |

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| | Ink No. | | 46 | 47 | 48 | 49 | 50 | 51 | 52 |
| Pigment (A) | C.I. pigment blue 15:6 | C.I. pigment blue 15:6-1 Specific surface area 95 m²/g, bulk density 0.1 kg/l | 2.4 | 2.4 | 2.4 | 2.4 | 2.4 | 2.4 | 2.4 |
| | Other phthalocyanine pigment | C.I. pigment blue 15:4 | | | | | | | |
| | Quinacridone pigment | C.I pigment red 122 | 1.6 | 1.6 | 1.6 | 1.6 | 1.6 | 1.6 | 1.6 |
| Dye derivative (B) | Pigment derivative having quinacridone skeleton | Compound represented by the general formula (4) in which both R3 and R4 are hydrogen atoms | | | | 0.25 | 0.25 | 0.25 | 0.25 |
| | Pigment derivative with copper phthalocyanine structure | Solsperse 12000 | | 0.25 | | | | | |
| | Benzoxazole pigment derivative | 1,4-bis(2-benzoxazolyl)naphthalene | | | 0.25 | | | | |
| Pigment dispersion resin (C) | Comb pigment dispersion resin having polyamine or polyimine as main chain | BYK-145 acid value 76 mgKOH/g, amine value 71 mgKOH/g | | | | | | | |
| | | Solsperse J180 acid value 35 mgKOH/g, amine value 30 mgKOH/g | 2 | 2 | 2 | | | | |
| | | BYK-140 acid value 73 mkgKOH/g, amine value 76 mgKOH/g | | | | | | 2 | |
| | | Solsperse 32000 acid value 20 mkgKOH/g, amine value 26 mgKOH/g | | | | | | | 2 |
| | Other | BYK-108 amine value 71 mgKOH/g | | | | | 2 | | |
| | | BYK-118 | | | | | | | 2 |

TABLE 2-continued

|  |  |  |  |  |  |  |  |  |
|---|---|---|---|---|---|---|---|---|
|  |  | acid value 36 mkgKOH/g |  |  |  |  |  |  |
| Polymerizable comound (D) | Difunctional | DPGDA | 30 | 30 | 30 | 50 | 50 | 30 | 30 |
|  |  | HDDA | 9.5 | 9.25 | 9.25 | 29.25 | 29.25 | 9.25 | 9.25 |
|  |  | PEGDA |  |  |  |  |  |  |  |
|  |  | VEEA | 40 | 40 | 40 |  |  | 40 | 40 |
|  | Monofunctional | PEA |  |  |  |  |  |  |  |
| Photo polymerization initiator (E) | α-hydroxy acetophenone-based (E-1) | OMNIRAD 659 | 2 | 2 | 2 |  |  |  |  |
|  |  | ESACURE ONE | 4 | 4 | 4 | 4 |  | 4 |  |
|  | Acylphosphine oxide-based | OMNIRAD 819 OMNIRAD TPO | 4 | 4 | 4 | 4 | 4 | 4 | 4 |
|  | Benzophenone-based | OMNIRAD BMS | 2 | 2 | 2 | 4 | 4 | 4 | 4 |
|  | Other | OMNIRAD EDB |  |  |  |  | 4 |  | 4 |
| Polymerization inhibitor | Hindered phenol-based | 2,6-di-t-butyl-4-methylphenol | 0.5 | 0.5 | 0.5 | 0.5 | 0.5 | 0.5 | 0.5 |
|  | Phenothiazine-based | Phenothiazine |  |  |  |  |  |  |  |
| Surface modifier | Polyether-modified siloxane-based | TEGO GUDE 450 | 2 | 2 | 2 | 2 | 2 | 2 | 2 |
|  |  | BYK UV 3510 |  |  |  |  |  |  |  |
|  |  | Total | 100 | 100 | 100 | 100 | 100 | 100 | 100 |
| Evaluation item |  | Color reproducibility | Not evaluating | OK | Not evaluating | OK | OK | OK | OK |
|  |  | Initial dispersion stability | 1 | 2 | 1 | 3 | 2 | 2 | 3 |
|  |  | Long-term dispersion stability | Not evaluating | 1 | Not evaluating | 2 | 1 | 2 | 2 |
|  |  | Discharge stability | Not evaluating | 1 | Not evaluating | 2 | 1 | 1 | 2 |
|  |  | Corrosion to epoxy adhesive | Not evaluating | 4 | Not evaluating | 1 | 2 | 3 | 3 |

|  |  |  | Comparative Example 8 | Comparative Example 9 | Comparative Example 10 | Comparative Example 11 | Comparative Example 12 | Comparative Example 13 |
|---|---|---|---|---|---|---|---|---|
|  |  | Ink No. | 53 | 54 | 55 | 56 | 57 | 58 |
| Pigment (A) | C.I. pigment blue 15:6 | C.I. pigment blue 15:6-1 Specific surface area 95 m²/g, bulk density 0.1 kg/l |  | 4 | 0.8 | 2.3 | 5.0 | 3.75 |
|  | Other phthalocyanine pigment | C.I. pigment blue 15:4 | 2.4 |  |  |  |  |  |
|  | Quinacridone pigment | C.I pigment red 122 | 1.6 |  | 3.2 |  |  |  |
| Dye derivative (B) | Pigment derivative having quinacridone skeleton | Compound represented by the general formula (4) in which both R3 and R4 are hydrogen atoms | 0.25 | 0.25 | 0.25 |  |  |  |
|  | Pigment derivative with copper phthalocyanine structure | Solsperse 12000 |  |  |  |  | 0.3 |  |
|  | Benzoxazole pigment derivative | 1,4-bis(2-benzoxazolyl)naphthalene |  |  |  |  |  | 0.3 |
| Pigment dispersion resin (C) | Comb pigment dispersion resin having polyamine or polyimine asmain chain | BYK-145 acid value 76 mgKOH/g, amine value 71 mgKOH/g |  | 2 | 2 |  |  |  |
|  |  | Solsperse J180 acid value 35 mgKOH/g, amine value 30 mgKOH/g | 2 |  |  |  |  |  |
|  |  | BYK-140 acid value 73 mkgKOH/g, amine value 76 mgKOH/g |  |  |  |  |  |  |
|  |  | Solsperse 32000 acid value 20 mgKOH/g, amine value 26 mgKOH/g |  |  |  | 1.1 | 2.4 | 1.5 |
|  | Other | BYK-108 amine value 71 mgKOH/g |  |  |  |  |  |  |
|  |  | BYK-118 acid value 36 mkgKOH/g |  |  |  |  |  |  |

TABLE 2-continued

| | | | | | | | | |
|---|---|---|---|---|---|---|---|---|
| Polymeriable comound (D) | Difunctional | DPGDA | 30 | 50 | 50 | 74.1 | 47.8 | 59.7 |
| | | HDDA | 9.25 | 29.25 | 29.25 | | | |
| | | PEGDA | | | | | 16.0 | 20 |
| | | VEEA | 40 | | | 10 | | |
| | Monofunctional | PEA | | | | | 22.0 | 9.6 |
| Photo polymerization initiator (E) | α-hydroxy acetophenone-based (E-1) | OMINIRAD 659 | 2 | | | | | |
| | | ESACURE ONE | 4 | | | | | |
| | Acylphosphine oxide-based | OMINIRAD 819 | 4 | 4 | 4 | | 3.0 | 3 |
| | | OMNIRAD TPO | | | | 5 | 3.0 | |
| | Benzophenone-based | OMINIRAD BMS | 2 | 4 | 4 | 3 | | |
| | Other | OMNIRAD EDB | | 4 | 4 | 3 | | 2 |
| Polymerization inhibitor | Hindered phenol-based | 2,6-di-t-butyl-4-methylphenol | 0.5 | 0.5 | 0.5 | 0.5 | | 0.1 |
| | Phenothiazine-based | Phenothiazine | | | | 0.5 | | |
| Surface modifier | Polyether-modified siloxane-based | TEGO GUDE 450 | 2 | 2 | 2 | | | |
| | | BYK UV 3510 | | | | 0.5 | 0.5 | 0.05 |
| | Total | | 100 | 100 | 100 | 100 | 100 | 100 |
| Evaluation item | Color reproducibility | | NG | NG | NG | NG | NG | NG |
| | Initial dispersion stability | | 5 | 3 | 3 | 3 | 2 | 3 |
| | Long-term dispersion stability | | 4 | 3 | 3 | 2 | 1 | 2 |
| | Discharge stability | | 4 | 2 | 1 | 1 | 2 | 1 |
| | Corrosion to epoxy adhesive | | 4 | 3 | 3 | 1 | 1 | 1 |

The details of the abbreviations and the product names described in Table 1 and Table 2 are as follows.

Solsperse 12000: copper phthalocyanine sulfonic acid (pigment derivative having a copper phthalocyanine structure manufactured by The Lubrizol Corporation)

BYK-145: pigment dispersing resin manufactured by BYK Chemie (acid value 76 mgKOH/g, amine value 71 mgKOH/g)

Solsperse J180: pigment dispersing resin manufactured by The Lubrizol Corporation (acid value 35 mgKOH/g, amine value 30 mgKOH/g)

BYK-106: pigment dispersing resin manufactured by BYK Chemie (acid value 132 mgKOH/g, amine value 74 mgKOH/g)

BYK-140: pigment dispersing resin manufactured by BYK Chemie (acid value 73 mgKOH/g, amine value 76 mgKOH/g)

Solsperse 32000: pigment dispersing resin manufactured by The Lubrizol Corporation (acid value 20 mgKOH/g, amine value 26 mgKOH/g)

BYK-108: pigment dispersing resin manufactured by BYK Chemie (amine value 71 mgKOH/g)

BYK-118: pigment dispersing resin manufactured by BYK Chemie (acid value 36 mgKOH/g)

TMPTA: trimethylolpropane triacrylate

TMP (EO) TA: trimethylolpropane EO-modified triacrylate

GPTA: propoxylated glyceryl triacrylate

PETA: pentaerythritol triacrylate

DPHA: dipentaerythritol hexaacrylate

DPGDA: dipropylene glycol diacrylate

HDDA: 1,6-hexanediol di(meth)acrylate

PEGDA: polyethylene glycol diacrylate

VEEA: 2-(2-vinyloxyethoxy) ethyl acrylate

BzA: benzyl acrylate

IBXA: isobornyl acrylate

THFA: tetrahydrofurfuryl acrylate (EO) PEA: ethoxylated 2-phenoxyethyl acrylate

PEA: 2-phenoxyethyl acrylate

OMNIRAD 659: 1-[4-(2-hydroxyethoxy)-phenyl]-2-hydroxy-2-methyl-1-propane-1-one (manufactured by IGM RESINS B. V.)

ESACURE ONE: oligo (2-hydroxy-2-methyl-1-(4-(1-methylvinyl)phenyl) propanone) (manufactured by IGM RESINS B. V.)

OMNIRAD 819: bis(2,4,6-trimethylbenzoyl)-phenylphosphine oxide (manufactured by IGM RESINS B. V.)

OMNIRADTPO: 2,4,6-trimethylbenzoyl-diphenyl-phosphine oxide (manufactured by IGM RESINS B. V.)

OMNIRAD BMS: 4-benzoyl-4'-methyl-diphenylsulfide (manufactured by IGM RESINS B. V.)

OMNIRAD EDB: ethyl-4-(dimethylamino)benzoate (manufactured by IGM RESINS B. V.)

TEGO GLIDE 450: polyether-modified siloxane surface modifier (manufactured by Evonik Degussa GmbH)

BYK UV 3510: polyether-modified siloxane surface modifier (manufactured by BYK Chemie)

Further, acrylic resin A and acrylic resin B described in Table 1 are resins respectively synthesized by the following methods.

<Synthesis Example of Acrylic Resin A>

90 parts of methyl ethyl ketone (MEK) were charged in a reaction vessel equipped with a nitrogen gas introduction tube, a thermometer, a condenser, and a stirrer, and the air was purged with nitrogen gas. After raising the temperature in the reaction vessel to 80° C., a mixture of 7.0 parts of N,N-dimethylaminomethacrylate, 6.5 parts of methacrylic acid, 60.0 parts of butyl acrylate as a resin configuration monomer, and, 26.5 parts of methoxypolyethylene glycol #600 acrylate, and, 6.0 parts of dimethyl 2,2'-azobis (2-methylpropionate) (V-601 manufactured by Wako Pure Chemical Corporation) as the polymerization initiator was added dropwise over 2 hours, and a polymerization reaction was carried out. Following completion of the dropwise addition, the reaction was continued at 80° C. for a further three hours, and then 0.6 part of V-601 was added and reacted at 80° C. for 1 hour. Then, MEK was removed under reduced pressure to obtain acrylic resin A (acid value 41 mgKOH/g, amine value 26 mgKOH/g).

<Synthesis Example of Acrylic Resin B>

With the exception of using 5.0 parts of N, N-dimethyl-aminomethacrylate, 12.0 parts of acrylic acid, 63.0 parts of butyl acrylate, and, 20.0 parts of methoxypolyethylene glycol #600 acrylate as the resin configuration monomer, acrylic resin B (acid value 94 mgKOH/g, amine value 19 mgKOH/g) was obtained by the same method as acrylic resin A.

As a result of the evaluations, it was verified that an active energy ray curable inkjet ink comprising a pigment (A), a colorant derivative (B), a pigment dispersing resin (C), and a polymerizable compound (D), wherein the pigment (A) comprises a C.I. pigment blue 15:6 and a quinacridone-based pigment, the aforementioned pigment (A) is 2 to 10% by mass in the ink, the mass ratio of the C.I. pigment blue 15:6 and the quinacridone-based pigment is 3:1 to 1:3, the aforementioned colorant derivative (B) comprises a quinacridone-based pigment derivative, satisfies the relationship C1>C2>0 when the acid value of the aforementioned pigment dispersing resin (C) is denoted as C1 (mgKOH/g) and the amine value of the aforementioned pigment dispersing resin (C) is denoted as C2 (mgKOH/g), has a practicable quality in all of the qualities required such as the color reproducibility, the initial dispersibility, the long-term dispersion stability, the inkjet discharge stability, and low corrosiveness to the epoxy adhesive.

Further, it was verified that Examples 2 to 4 which contain 2-(2-vinyloxyethoxy) ethyl acrylate as the polymerizable compound (D) have a more excellent long-term dispersion stability and a lower corrosiveness to the epoxy adhesive compared to Example 1 which does not contain 2-(2-vinyloxyethoxy) ethyl acrylate.

Further, it was verified that when an α-hydroxyacetophenone initiator (E-1) is included as the photopolymerization initiator (E), the effect is more excellent from the viewpoint of the long-term dispersion stability and the discharge stability. (for example, Example 1 and Example 13)

On the one hand, when a colorant derivative was not used (Comparative Example 1), and when a colorant derivative other than quinacridone-based pigment derivative was used (Comparative Examples 2 and 3), the initial dispersibility was insufficient, and the desired active energy ray curable inkjet ink could not be obtained.

Further, it was confirmed that the pigment dispersing resin was inferior from the viewpoint of the initial dispersion stability and the low corrosiveness to the epoxy adhesive, in the cases when a resin which satisfies one of the relationships C1'<C2', C1'-0, or C2'=0 wherein the acid value of the pigment dispersing resin is denoted as Cl' (mgKOH/g) and amine value of the aforementioned pigment dispersing resin is denoted as C2' (mgKOH/g) was used (Comparative Examples 4 to 7).

Further, Comparative Example 8 is an ink which used the C.I. pigment blue 15:4 in place of the C.I. pigment blue 15:6. Comparative Examples 9 and 10 are inks in which the ratio of C.I. pigment blue 15:6 and quinacridone-based pigment were outside the range of a mass ratio from 3:1 to 1:3. None of these Comparative Examples could reproduce the desired color gamut, and an active energy ray curable inkjet ink which can satisfactorily reproduce the desired color in the blue region could not be obtained.

Comparative Example 11 is an ink that reproduced B2 of Table 2 of Patent Document 2. Comparative Example 12 is an ink that reproduced Blue Ink No.16 (d) of Example 2 of Patent Document 4. Comparative Example 13 is an ink that makes up Example 39 described in Table 5 of Patent Document 5. None of these Comparative Examples could reproduce the desired color gamut, and the evaluations of the long-term dispersion stability and the low corrosiveness to epoxy adhesive were significantly inferior, thus, a practical active energy ray curable inkjet ink could not be obtained.

<2>Active Energy Ray Curable Ink Set

The yellow ink, the magenta ink, and, the black ink illustrated below were produced. Next, these inks were combined together with the active energy ray curable inkjet ink (blue ink) produced in the aforementioned Examples and Comparative Examples to prepare the ink sets, and the color clarity and the color development were evaluated.

[Production of Yellow Ink 1]

First, prior to production of the yellow ink, the yellow pigment dispersion was produced as follows. 15 parts of C.I. pigment yellow 139, 10 parts of BYK-145 as the pigment dispersing resin, and 75 parts of dipropylene glycol diacrylate (DPGDA) were charged in a tank. This mixture was stirred with a high-speed mixer until a uniform mixture was obtained, and then dispersed for 1 hour with a standing sand mill to produce a yellow pigment dispersion.

Next, 15 parts of the yellow pigment dispersion obtained thereby, 40 parts of dipropylene glycol diacrylate (DPGDA), 30 parts of 1,6-hexanediol di(meth)acrylate, 4 parts of bis(2,4,6-trimethylbenzoyl)-phenylphosphine oxide ("OMNIRAD 819" manufactured by IGM RESINS B. V.), 4 parts of oligo (2-hydroxy-2-methyl-1-(4-(1-methvinyl)phenyl) propane) ("ESACURE ONE" manufactured by IGM RESINS B. V.), 4 parts of 4-benzoyl-4'-methyl-diphenylsulfide ("OMNIRADBMS" manufactured by IGM RESINS B. V.), 2.5 parts of polyether-modified siloxane surface modifier (manufactured by Evonik Degussa GmbH "TEGO GLIDE 450"), and 0.5 part of 2,6-di-t-butyl-4-methylphenol were added in sequence while stirring, and mixed until the photopolymerization initiator dissolved. Moreover, filtration was performed using a depth type filter having a 1 μm pore size, and the coarse particles were removed to obtain a yellow ink 1.

[Production of Yellow Inks 2 to 6 to 9

With the exception that the pigment used in yellow ink 1 was changed to the pigments described in Table 3, yellow inks 2 to 6 were produced by the same method as the aforementioned yellow ink 1.

TABLE 3

| Yellow Ink No. | Yellow pigment used in yellow ink |
| --- | --- |
| 1 | C.I. pigment yellow 139 |
| 2 | C.I. pigment yellow 185 |
| 3 | C.I. pigment yellow 174 |
| 4 | C.I. pigment yellow 180 |
| 5 | C.I. pigment yellow 194 |
| 6 | C.I. pigment yellow 150 |

[Production of Magenta Ink 1]

First, prior to production of the magenta ink, the magenta pigment dispersion was produced as follows. 15 parts of C.I. pigment red 122, 10 parts of BYK-145 as the pigment dispersing resin, and 75 parts of dipropylene glycol diacrylate (DPGDA) were charged in a tank. This mixture was stirred with a high-speed mixer until a uniform mixture was obtained, and then dispersed for 1 hour with a standing sand mill to produce a magenta pigment dispersion.

Next, 20 parts of the magenta pigment dispersion obtained thereby, 35.5 parts of dipropylene glycol diacrylate (DPGDA), 30 parts of 1,6-hexanediol di(meth)acrylate, 4 parts of bis(2,4,6-trimethylbenzoyl)-phenylphosphine oxide ("OMNIRAD 819" manufactured by IGM RESINS B. V.), 4 parts of oligo (2-hydroxy-2-methyl-1-(4-(1-methylvinyl) phenyl) propane) ("ESACURE ONE" manufactured by IGM RESINS B. V.), 4 parts of 4-benzoyl-4'-methyl-diphenylsulfide ("OMNIRAD BMS" manufactured by IGM RESINS B. V.), 2 parts of polyether-modified siloxane surface modifier (manufactured by Evonik Degussa GmbH "TEGO GLIDE 450"), and 0.5 part of 2,6-di-t-butyl-4-methylphenol were added in sequence while stirring, and mixed until the photopolymerization initiator dissolved. Moreover, filtration was performed using a depth type filter having a 1 μm pore size, and the coarse particles were removed to obtain a magenta ink 1.

[Production of Magenta Inks 2 to 5]

With the exception that the pigment used in the magenta ink 1 was changed to the pigments described in Table 4, magenta inks 2 to 5 were produced by the same method as the aforementioned magenta ink 1.

TABLE 4

| Magenta Ink No. | Magenta pigment used in magenta ink |
|---|---|
| 1 | C.I. pigment red 122 |
| 2 | C.I. pigment red 146 |
| 3 | C.I. pigment red 147 |
| 4 | C.I. pigment red 150 |
| 5 | C.I. pigment red 170 |

[Production of Black Ink]

First, prior to production of the black ink, the black pigment dispersion was produced as follows. 15 parts of carbon black, 5 parts of BYK-145 as the pigment dispersing resin, and 80 parts of dipropylene glycol diacrylate (DPGDA) were charged in a tank. This mixture was stirred with a high-speed mixer until a uniform mixture was obtained, and then dispersed for 1 hour with a standing sand mill to produce a black pigment dispersion.

Next, 15 parts of the obtained black pigment dispersion, 41 parts of dipropylene glycol diacrylate (DPGDA), 30 parts of 1,6-hexanediol di(meth)acrylate, 4 parts of bis(2,4,6-trimethylbenzoyl)-phenylphosphine oxide ("OMNIRAD 819" manufactured by IGM RESINS B. V.), 4 parts of oligo (2-hydroxy-2-methyl-1-(4-(1-methylvinyl)phenyl) propane) ("ESACURE ONE" manufactured by IGM RESINS B. V.), 4 parts of 4-benzoyl-4'-methyl-diphenylsulfide ("OMNIRAD BMS" manufactured by IGM RESINS B. V.), 1.5 parts of polyether-modified siloxane surface modifier ("TEGO GLIDE 450" manufactured by Evonik Degussa GmbH), and 0.5 part of 2,6-di-t-butyl-4-methylphenol were added in sequence while stirring, and mixed until the photopolymerization initiator dissolved. Moreover, filtration was performed using a depth type filter having a 1 μm pore size, and the coarse particles were removed to obtain a black ink.

Examples 46 to 56 and Comparative Example 14

<Color Clarity and Color Development>

First, the ink sets were prepared by combining the active energy ray curable inkjet ink (blue ink), the yellow ink, the magenta ink, or, the black ink respectively produced as described above as described in Table 5. An inkjet discharge apparatus (OnePass JET manufactured by Tritek Co., Ltd.) fitted with four heads manufactured by KYOCERA Corporation (resolution: 600 dpi×600 dpi) was filled with the aforementioned ink set.

Next, an N5 (bicycle) image of high-definition color digital standard image data (in compliance with ISO/JIS-SCID JIS X 9201) was printed on a substrate "PET K2411" manufactured by Lintec Corporation. Next, a 240 W/cm metal halide lamp manufactured by GEW Ltd. was used to cure the aforementioned N5 image, and the printed matter of a bicycle was prepared. The head temperature during printing was 40° C. Further, the series of processes from printing to curing is performed at a printing speed of 50 m/min.

The obtained printed matter of a bicycle was examined visually, and the color clarity and the color development were evaluated by grading on the following scale from 1 to 4. Note that, grades of 2 or more were deemed to be in the practicable region.

(Evaluation Criteria)

4: The color clarity and color development were excellent compared to the printed matter of a bicycle prepared in Example 50.

3: The color clarity and the color development were the same as the printed matter of a bicycle prepared in Example 50.

2: The color clarity and the color development were slightly inferior compared to the printed matter of a bicycle prepared in Example 50. However, this was to a level that did not pose a problem in actual use.

1: The printed matter clearly had a low color clarity, and had a low density.

TABLE 5

| | | Example 46 | Example 47 | Example 48 | Example 49 | Example 50 | Example 51 | Example 52 |
|---|---|---|---|---|---|---|---|---|
| Ink set | Blue ink | 1 PB15:6 + PR122 | 13 PB15:6 + PR202 | 1 PB15:6 + PR122 | 1 PB15:6 + PR122 | 1 PB15:6 + PR122 | 1 PB15:6 + PR122 | 1 PB15:6 + PR122 |
| | Yellow ink | 1 PY139 | 2 PY185 | 2 PY185 | 3 PY174 | 4 PY180 | 5 PY194 | 6 PY150 |
| | Magenta ink | 1 PR122 | 1 PR122 | 1 PR122 | 1 PR122 | 1 PR122 | 1 PR122 | 1 PR122 |
| Evaluation item | Color clarity and Color development | 2 | 2 | 3 | 3 | 3 | 2 | 2 |

TABLE 5-continued

|  |  | Example 53 | Example 54 | Example 55 | Example 56 | Comparative Example 14 |
|---|---|---|---|---|---|---|
| Ink set | Blue ink | 1<br>PB15:6 + PR122 | 1<br>PB15:6 + PR122 | 1<br>PB15:6 + PR122 | 1<br>PB15:6 + PR122 | 37<br>PB15:4 + PR122 |
|  | Yellow ink | 2<br>PY185 | 2<br>PY185 | 2<br>PY185 | 2<br>PY185 | 2<br>PY185 |
|  | Magenta ink | 2<br>PR146 | 3<br>PR147 | 4<br>PR150 | 5<br>PR170 | 1<br>PR122 |
| Evaluation item | Color clarity and Color development | 4 | 4 | 4 | 4 | 1 |

As shown in Table 5, the printed matter having a particularly excellent color clarity and color development could be obtained with the ink set (the combination of Examples 53 to 56) having the active energy ray curable inkjet ink, the yellow pigment having the partial structure represented by general formula (6), and/or, the yellow ink comprising the yellow pigment having the partial structure represented by general formula (7), and the magenta ink comprising the magenta pigment having the partial structure represented by general formula (8) of the embodiment of the present invention.

The invention claimed is:

1. An active energy ray curable inkjet ink comprising a pigment (A), a colorant derivative (B), a pigment dispersing resin (C) and a polymerizable compound (D), wherein
the pigment (A) contains a C.I. pigment blue 15:6 and a quinacridone-based pigment,
the total mass of the blending amount of the C.I. pigment blue 15:6 and the blending amount of the quinacridone-based pigment is from 2 to 10% by mass based on the total mass of the ink,
the mass ratio of the C.I. pigment blue 15:6 and the quinacridone-based pigment is from 3:1 to 1:3,
the colorant derivative (B) contains a quinacridone-based pigment derivative, and
satisfying the relationship $C1 \geq C2 > 0$ when the acid value of the pigment dispersing resin (C) is denoted as C1 (mgKOH/g), and the amine value of the pigment dispersing resin (C) is denoted as C2 (mgKOH/g).

2. The active energy ray curable inkjet ink according to claim 1, wherein the polymerizable compound (D) comprises from 20 to 60% by mass of 2-(2-vinyloxyethoxy) ethyl acrylate based on the total mass of the inkjet ink.

3. The active energy ray curable inkjet ink according to claim 1 further comprising a photopolymerization initiator (E), and comprising at least one type of α-hydroxyacetophenone photopolymerization initiator (E-1) as the photopolymerization initiator (E).

4. The active energy ray curable inkjet ink according to claim 1 further comprising a photopolymerization initiator (E), and comprising at least one type of α-hydroxyacetophenone photopolymerization initiator (E-1) as the photopolymerization initiator (E).

5. A printed matter obtained by printing the active energy ray curable inkjet ink according to claim 1 on a recording medium.

6. The printed matter obtained by printing the active energy ray curable ink set according to claim 4 on a recording medium.

* * * * *